Dec. 3, 1963  B. R. GARDNER  3,113,306
METHOD AND APPARATUS FOR VEHICLE GUIDANCE
Original Filed July 9, 1956  12 Sheets-Sheet 1

INVENTOR.
BEN R. GARDNER
BY John C. Blair
ATTORNEY

Dec. 3, 1963   B. R. GARDNER   3,113,306
METHOD AND APPARATUS FOR VEHICLE GUIDANCE
Original Filed July 9, 1956   12 Sheets-Sheet 2

INVENTOR.
BEN R. GARDNER
BY John C. Blair
ATTORNEY.

INVENTOR.
BEN R. GARDNER

Dec. 3, 1963            B. R. GARDNER            3,113,306

METHOD AND APPARATUS FOR VEHICLE GUIDANCE

Original Filed July 9, 1956            12 Sheets-Sheet 4

Frequency Discriminator

INVENTOR.
BEN R. GARDNER

BY John C. Blair

ATTORNEY.

INVENTOR.
BEN R. GARDNER
ATTORNEY.

INVENTOR.
BEN R. GARDNER
BY John C. Blair
ATTORNEY.

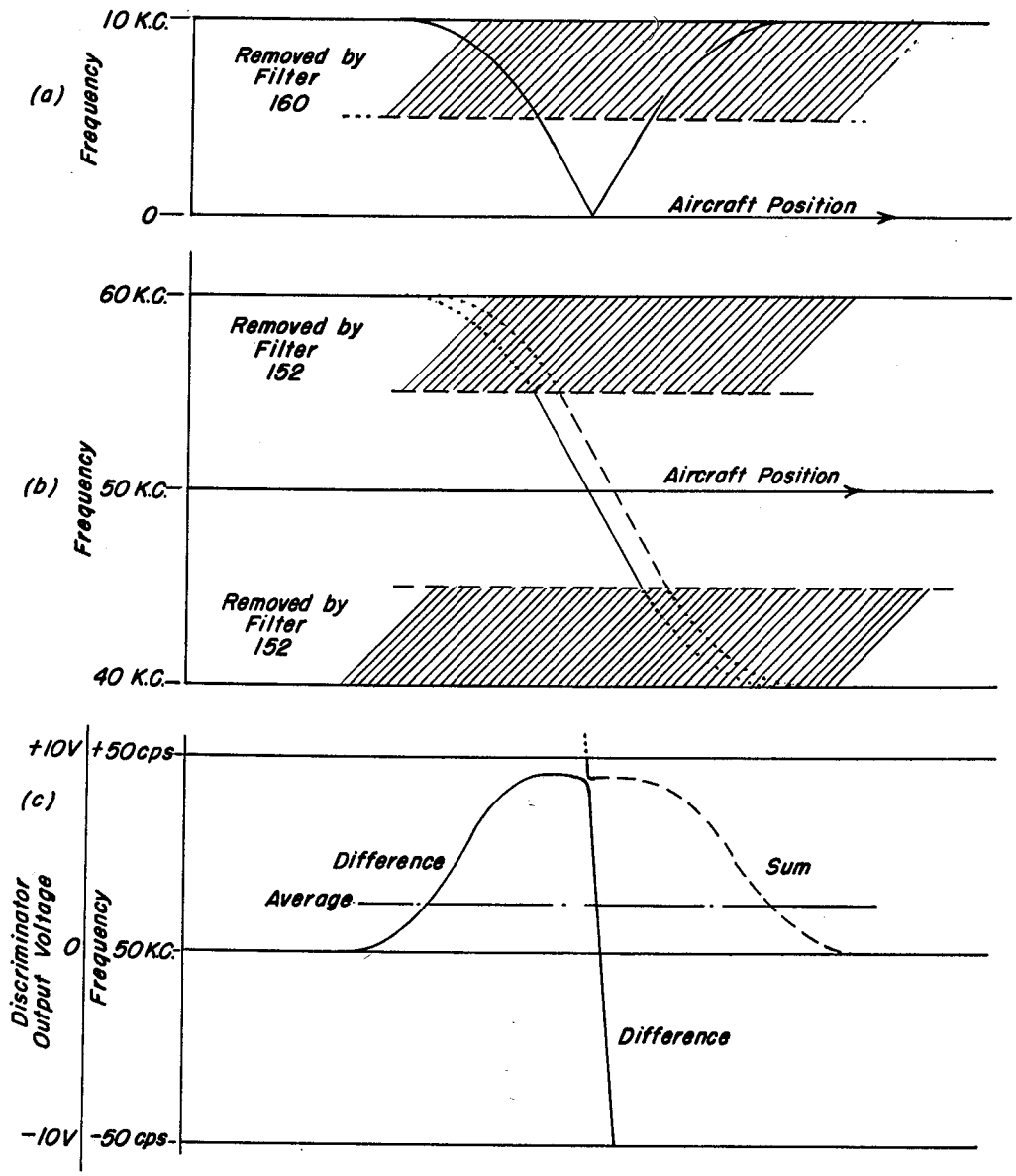

INVENTOR.
BEN R. GARDNER

INVENTOR.
BEN R. GARDNER
BY
John C. Blair
ATTORNEY.

Dec. 3, 1963        B. R. GARDNER        3,113,306
METHOD AND APPARATUS FOR VEHICLE GUIDANCE
Original Filed July 9, 1956        12 Sheets-Sheet 12

INVENTOR.
BEN R. GARDNER
BY John C. Blair
ATTORNEY.

United States Patent Office 3,113,306
Patented Dec. 3, 1963

3,113,306
METHOD AND APPARATUS FOR VEHICLE GUIDANCE
Ben R. Gardner, P.O. Box 1267, Rancho Santa Fe, Calif.
Continuation of application Ser. No. 596,520, July 9, 1956. This application Aug. 1, 1960, Ser. No. 47,346
28 Claims. (Cl. 343—7)

This invention relates to a method and apparatus for determining the position of a moving vehicle with respect to a predetermined path. More particularly, it relates to a system for guiding a vehicle using "waveform-matching" techniques, wherein the position of the moving vehicle is continuously compared with information stored in a record carried by the vehicle. Thus the moving vehicle may be guided along a predetermined path by continuous comparison of received information indicating the vehicle's present position with information previously recorded, using the error signal developed by the comparison to control the heading and, if desired, the speed of the moving vehicle.

This application is a continuation of my United States copending application Serial No. 596,520, filed July 9, 1956, now abandoned.

Map-matching systems have heretofore been used for guidance of moving vehicles, and in particular for aircraft. In general, such systems operate in the following manner. A photographic record is prepared of the signals which a radar carried by the aircraft would display at each point along the path if the vehicle were on course. Such records may be made in a number of ways, the simplest of which is to make an actual reconnaissance flight over the path to be traversed with a radar-equipped vehicle and continuously photograph the signals displayed by the radar. Such a record may also be prepared by constructed an analogue of the terrain that would be "seen" by an aircraft flying the predetermined path from reconnaissance photographs and maps. This analogue is constructed in a tank filled with water, and a "sonic" radar, i.e. a pulsed sonar with a narrow beam is pulled through the water-filled tank. The analogous targets in the tank respond to the sound waves emitted by the sonar in the same way as true targets reflect electro-magnetic energy from a radar. Thus a "synthetic" record may be constructed which is similar to the actual record. When it is desired to guide the aircraft along the chosen path, apparatus in the aircraft optically compares the targets dispayed by the aircraft radar with those of the recorded photographs and controls the vehicle to insure that it travels the predetermined path.

While systems of this type operate satisfactorily, the equipment required to perform the guidance task is complex, heavy and expensive. Since such systems utilize direct comparison of a radar display and photographs of the desired display, it is necessary that the radar system display the information it collects in conventional fashion, as on a plan position indicator. This means that a large number of resolvable elements must be displayed to obtain the relatively small amount of information required for guidance. To handle this large amount of information in a serial fashion the system must have a wide band width, which increases the noise and extraneous information.

There are problems also with the use of a photographic record. The film must be processed with extreme care to avoid shrinkage and consequent distortion of the image. The photographic record provides an image which is stored in discrete steps while the radar display is constantly changing as the aircraft moves. Thus the record on the film and the display match at only one instant of time or position in space. At all other times they are mismatched and only approximate guidance can take place.

Also, in prior systems of the type described, it was usually necessary to "filter" the radar information because of target position instabilities on the plan position indicator. These resulted from sweep jitter and instabilities in the azimuth servo. Filtering was accomplished by either developing the film to produce a poor grey scale so that all targets above a given level appeared dark, while those below this level did not appear at all or by inserting low pass filters in the video input lead to the plan position indicator. These filtering techniques resulted in some degradation in system performance.

Accordingly, to overcome these and other problems associated with prior systems it is a principal object of my invention to provide a system, using improved apparatus and methods for determining the position of a moving vehicle with respect to a predetermined path using waveform-matching rather than map-matching techniques in which the stored information is continuously recorded. Another object of my invention is to provide a system of the type described useful in guiding a moving vehicle along a predetermined path and capable of controlling both vehicle heading and velocity. Another object of my invention is to provide a system of the type described which automatically separates stable, useful targets for vehicle guidance from usable targets and noise. Still another object of my invention is to provide a system of the type described which is relatively simple and free from the equipment complexity heretofore required in map-matching systems. A further object of my invention is to provide an improved method for determining the position of a moving vehicle with respect to a predetermined path which utilizes the Doppler shift in frequency and the rate of change of Doppler shift in frequency in signals transmitted from the vehicle and reflected by ground targets thereto. Still another object of my invention is to provide a system of the type described wherein the recorded data to be used may be easily obtained and recorded by a single reconnaissance trip over the path which the guided vehicle is to travel. Yet another object of my invention is to provide a system of the type described which provides data as to deviation of the vehicle from the predetermined path both in velocity and direction. A further object of my invention is to provide a system of the type described in which, during guidance, the rate of taking data from the record may be readily varied to obviate the requirement for travelling the predetermined path at exactly the same speed as when the data were taken. A further object of my invention is to provide a system of the type described which simultaneously and continuously observes the returns from all targets within its range and antenna illumination. Still another object of my invention is to provide an improved system of the above character for use in guiding aircraft along a predetermined flight path. Yet another object of my invention is to provide an improved system of the above character for use in guiding aircraft during blind landings. A still further object of my invention is to provide an improved system for use in guiding ships or submarines over predetermined paths, particularly in or about coast lines or harbors. A final stated object of my invention is to provide an improved system and method of the type described whose output signals are readily usable with conventional auto-pilots as used with aircraft, ships and other vehicles. Other objects of my invention will in part be obvious and will in part appear hereinafter.

The invention accordingly comprises the several steps and the relation of one or more of such steps with respect to each of the others, and the apparatus embodying the features of construction, combinations of elements, and arrangements of parts which are adapted to effect all such steps, all as exemplified in the following detailed disclosure; the scope of the invention will be indicated in the claims.

For a fuller understanding of the nature and objects of the invention, reference should be had to the following detailed description taken in connection with the accompanying drawings in which.

Figure 8:
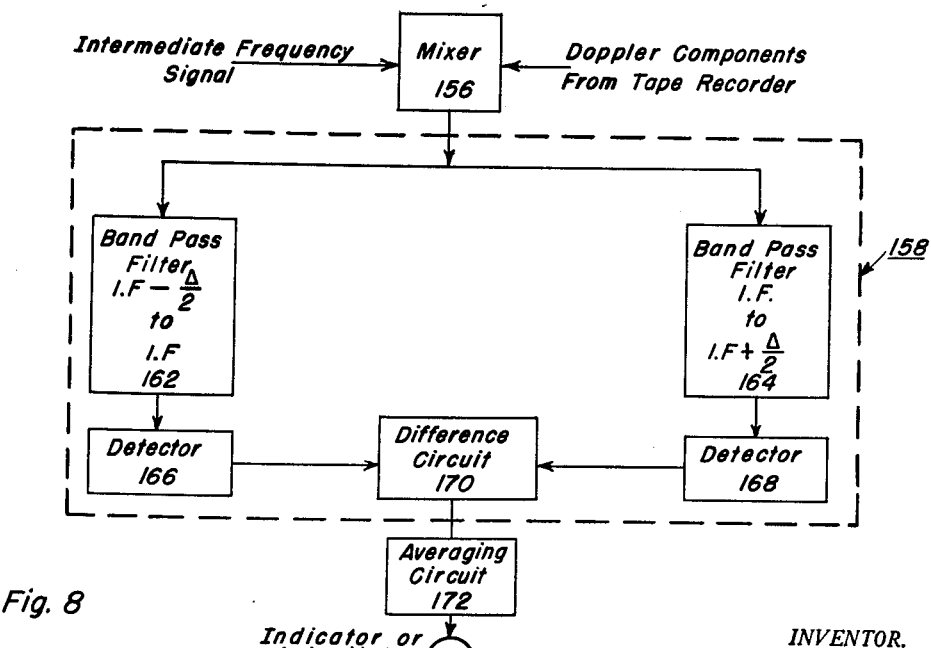
FIGURE 8 is a block diagram of the frequency discriminator used in the apparatus of FIGURE 6.
Figure 7:
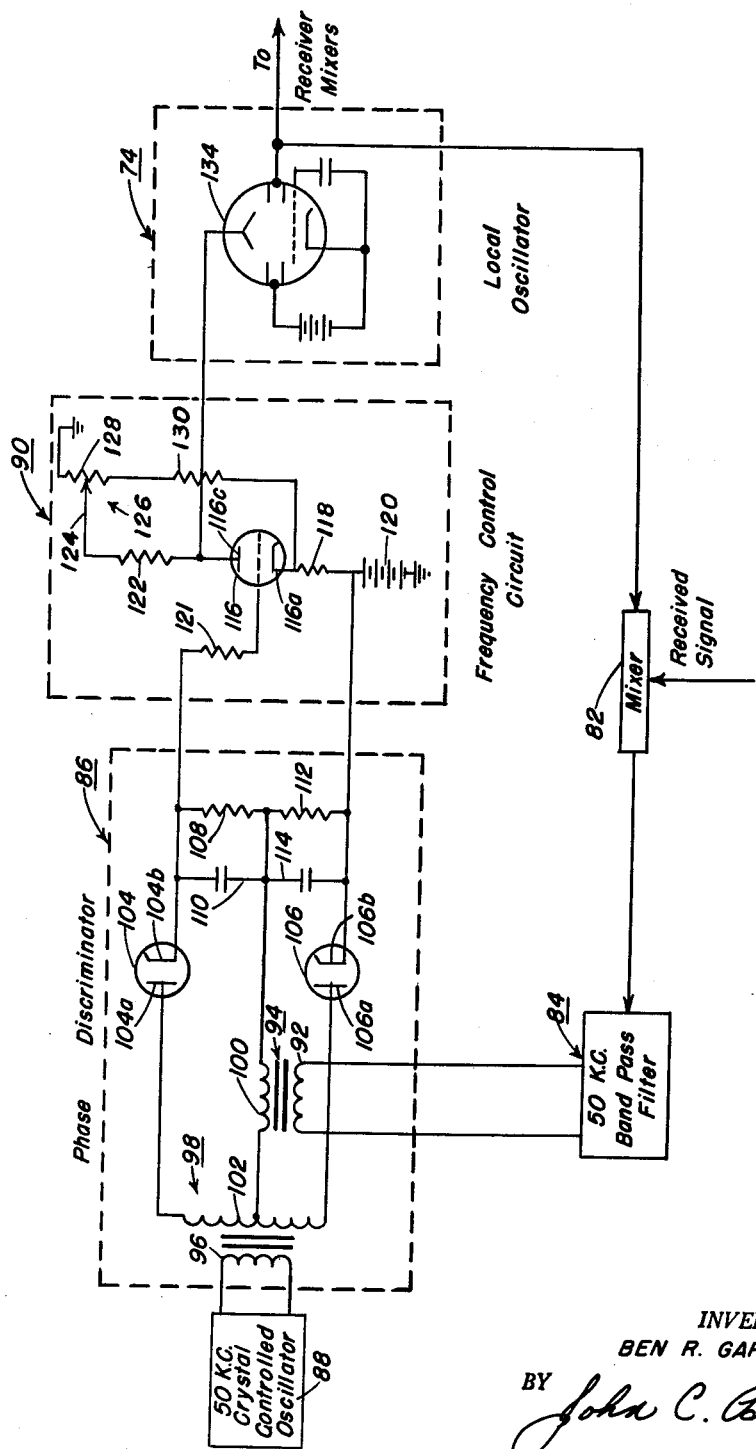
FIGURE 7 is a block diagram illustrating the transmitter and local oscillator frequency control circuit used in the apparatus of FIGURE 6.
Figure 10:
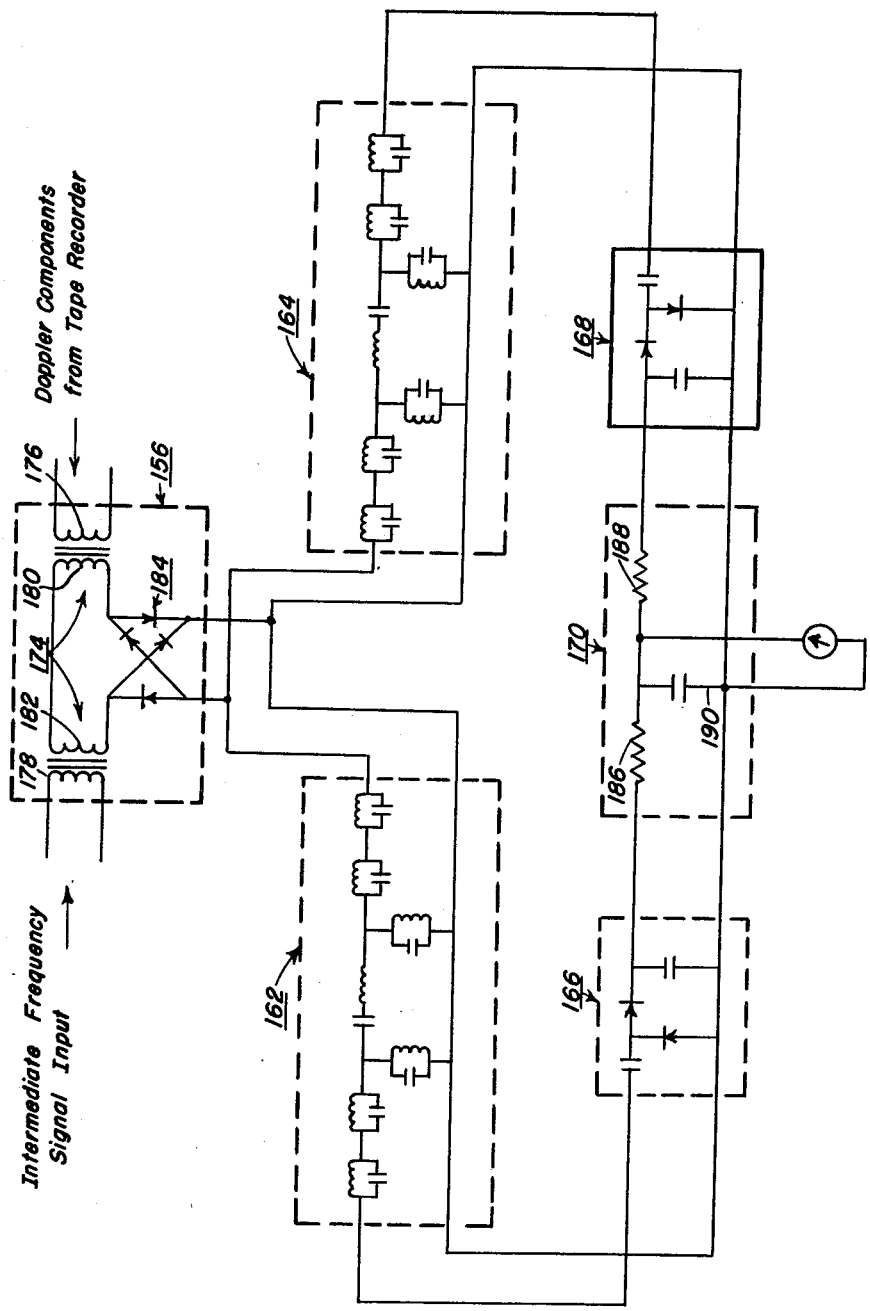
Figure 12:
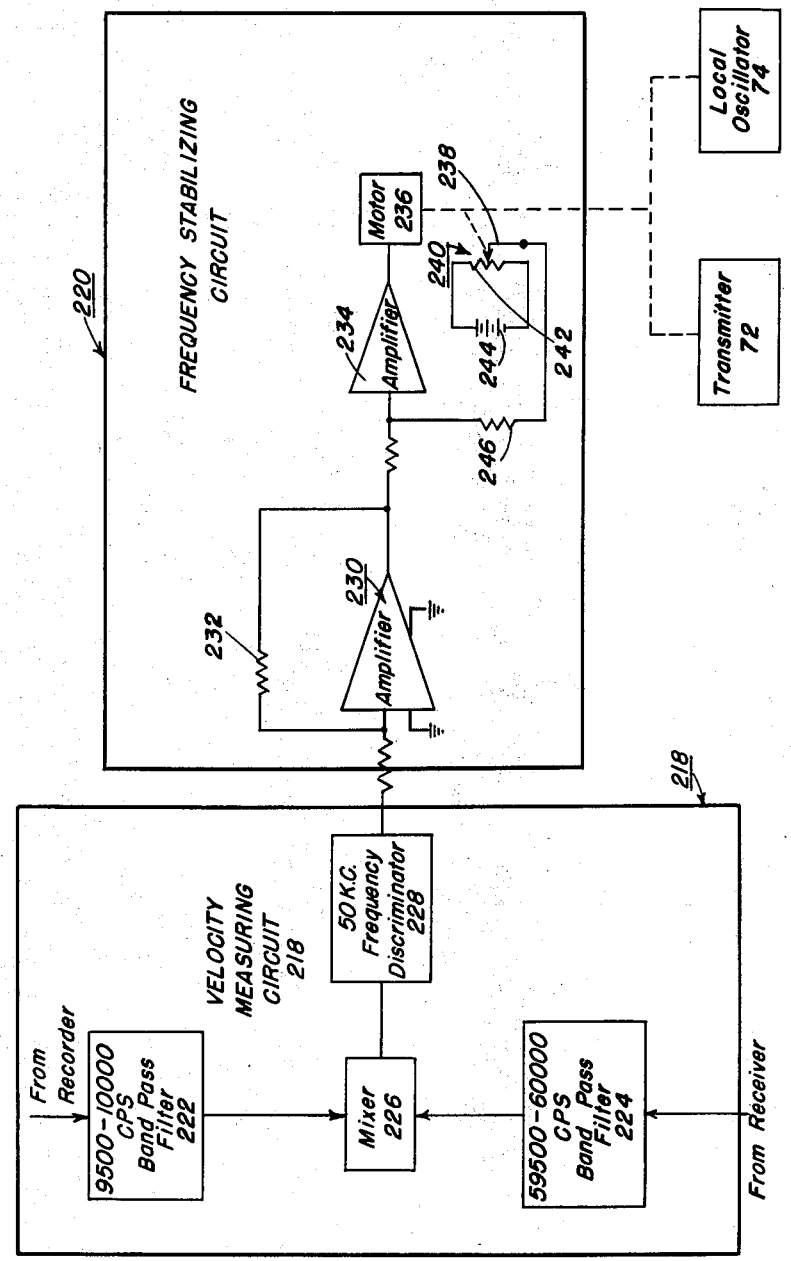
Figure 13:
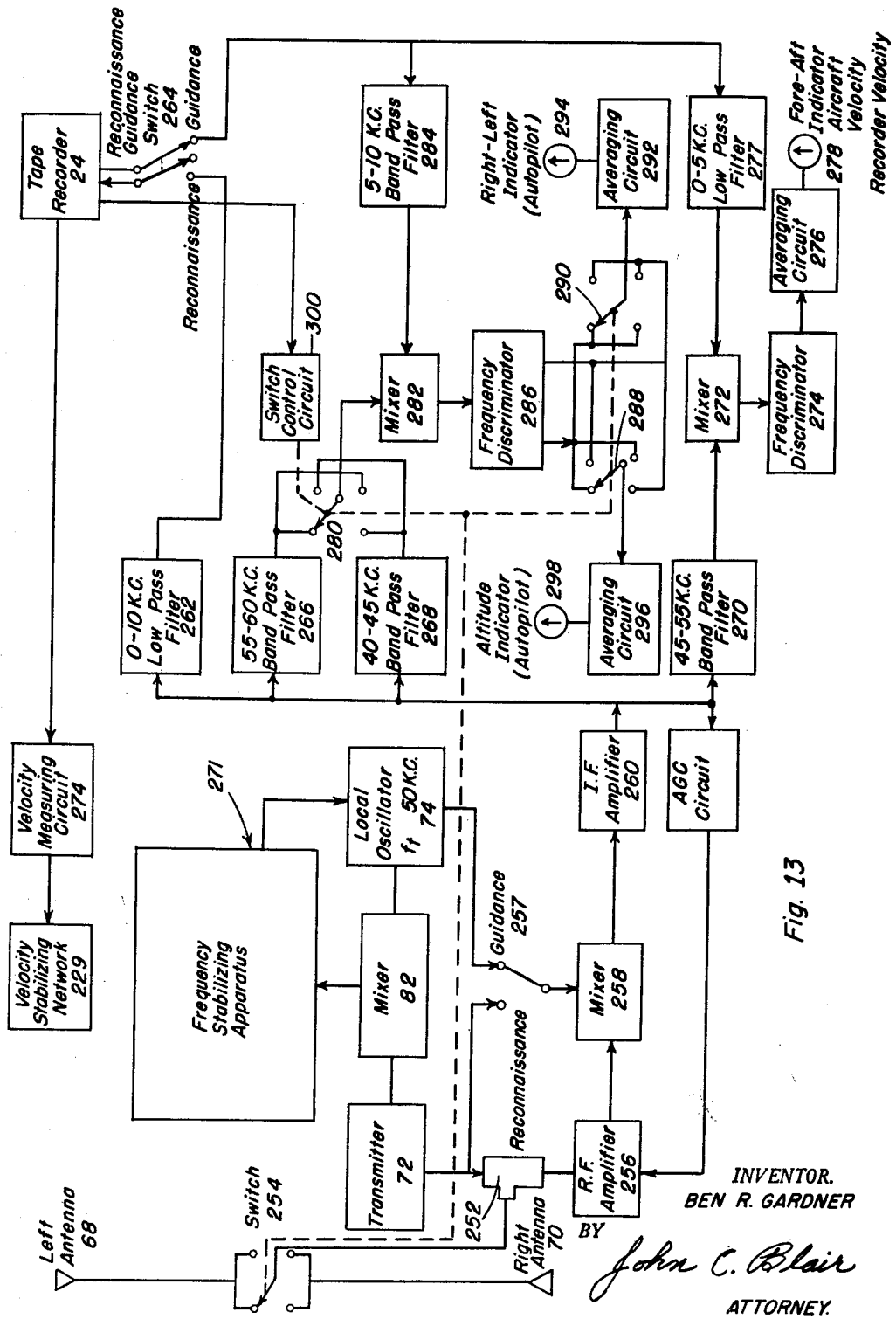
Figure 14:
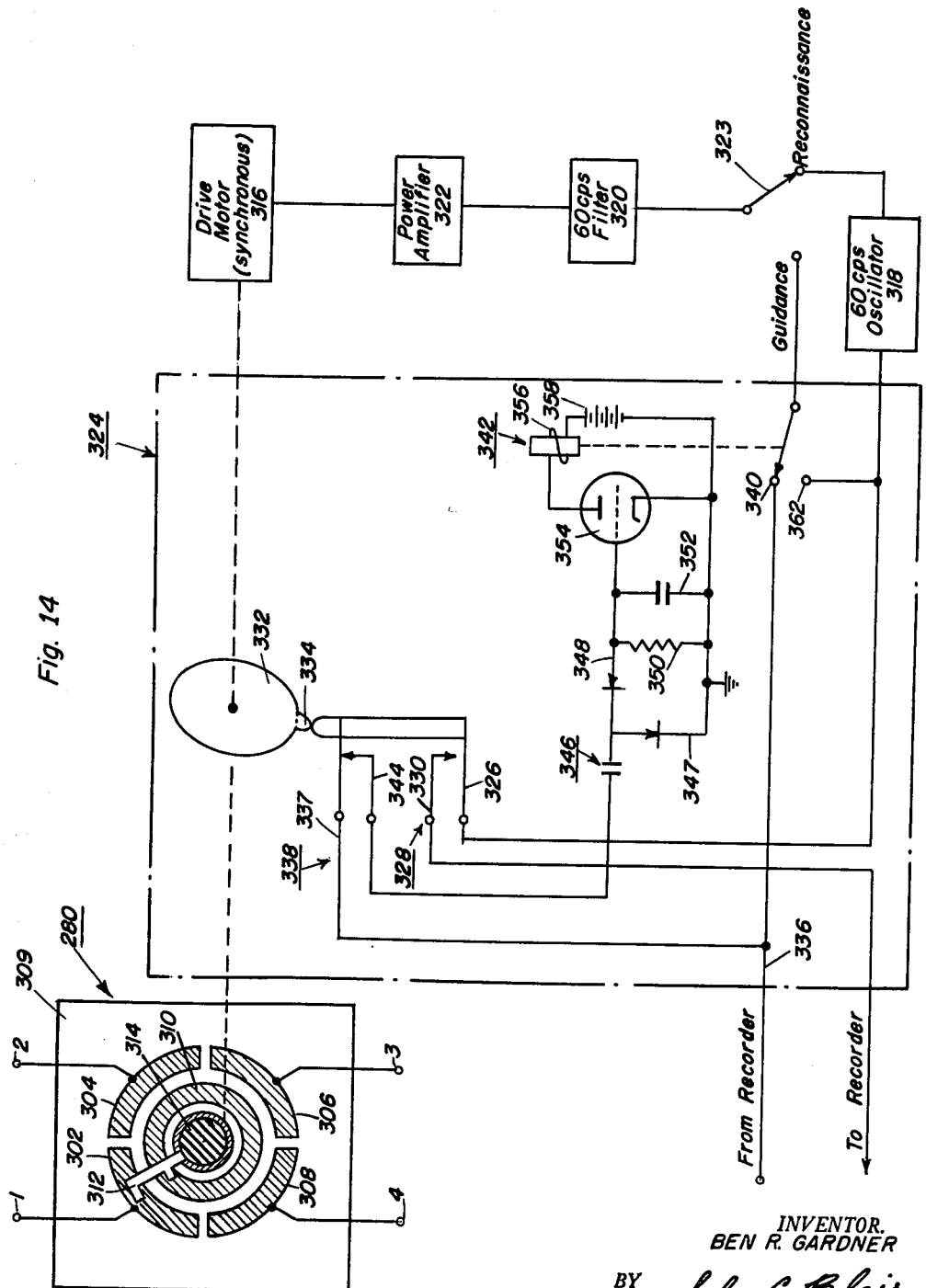

FIGURES 9a, b and c are graphs illustrating the operation of the frequency discriminator of FIGURE 8 in determining fore and aft deviations along the guidance path;

FIGURE 10 is a schematic diagram of one type of electrical circuit which could be used for the frequency discriminator of FIGURE 8;

FIGURES 11a, b and c are diagrams illustrating the operation of the frequency discriminator in determining right-left and altitude deviations from the guidance path;

FIGURE 12 is a circuit diagram, partially in block diagram form, and partially in schematic form of the velocity stabilizing and measuring circuits illustrated in the embodiment of FIGURE 7;

FIGURE 13 is a block diagram of a second embodiment of apparatus for guidance of a vehicle made according to my invention, which utilizes time-sharing to minimize the required equipment; and FIGURE 14 is a diagram, partially pictorial and partially in block diagram form, of the time-sharing switch of the embodiment of FIGURE 13.

Similar reference characters refer to similar parts throughout the several views of the drawings.

In general, my invention utilizes the Doppler shift in frequency of a signal transmitted from a moving vehicle and reflected from stationary targets back to a receiver in the vehicle to guide the vehicle along a predetermined path. As will be explained below, both the magnitude and the rate of change of the shift in frequency are utilized.

For simplicity of explanation, my invention will be described in terms of aircraft guidance, it being understood that it can also be utilized for the other types of vehicles, e.g. land vehicles and ships.

The Doppler shift in frequency as a result of relative motion between an observer and a source of a signal has been observed both in sonic and electromagnetic signals, i.e. radio and radar signals. As the observer moves toward a signal source, the frequency of the signal which the observer receives appears higher to him than if he were standing still; similarly, as he moves away from a signal source, the frequency appears lower than if he were stationary. In the case of a group of stationary objects illuminated by a signal transmitted from a moving vehicle and reflecting a portion thereof back to the vehicle, each of the objects (hereinafter called "targets") is in effect a signal source. When this received signal is compared in the vehicle with the frequency of the transmitted signal, both the magnitude and direction as well as rate of change of frequency shift may be measured and used to determine the position of the target with respect to the vehicle. This difference frequency in signals reflected from fixed targets to a moving vehicle depends upon the frequency of the transmitted signal and the relative closing velocity of the vehicle and the target. Thus the Doppler shift will be greatest in signals reflected from targets a substantial distance ahead and a substantial distance behind the vehicle, because the relative motion of these targets with respect to the moving vehicle is then greatest. Targets a substantial distance ahead of the vehicle will reflect a higher frequency than the transmitted frequency, while those a substantial distance behind the vehicle will reflect a frequency which is lower than the transmitted frequency. Targets directly abeam of the transmitting vehicle will reflect a signal at the transmitted frequency, since they have no component of relative motion either toward or away from the vehicle.

Figure 1:
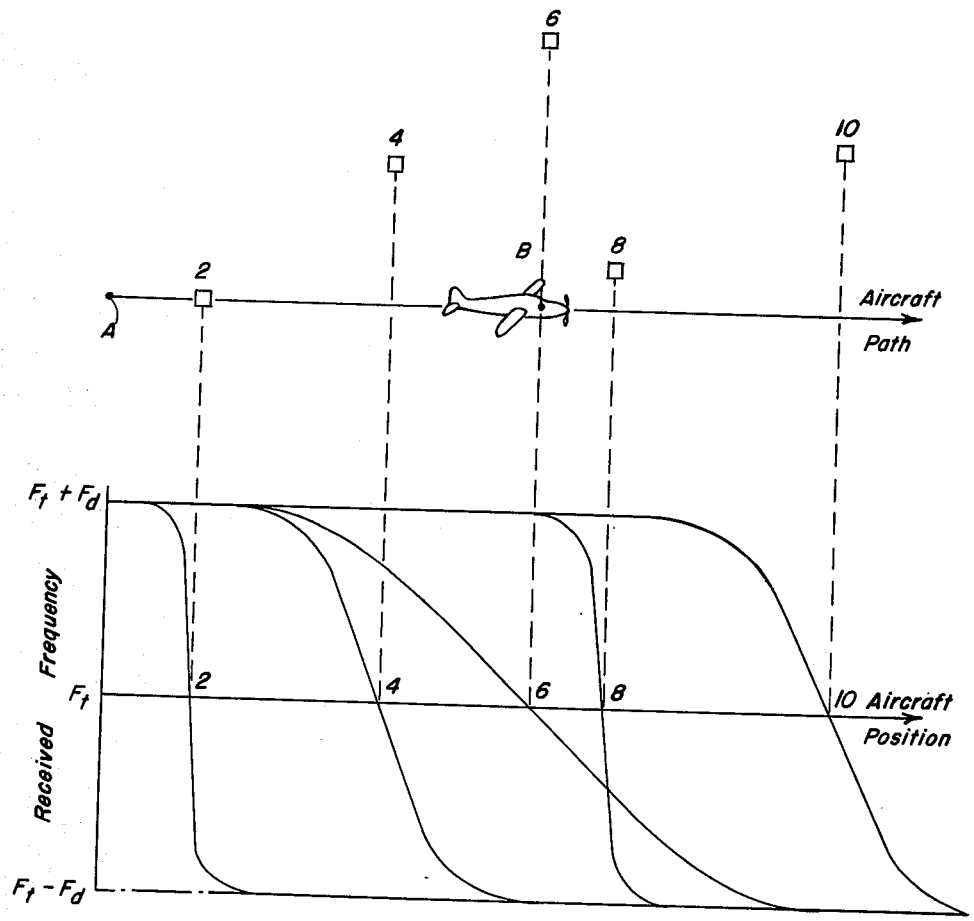
FIGURE 1 is an illustration of the Doppler effect in signals reflected from stationary targets back to a signal source located on a moving vehicle.

In FIGURE 1 there are diagrammatically illustrated the Doppler signals which would be received by an aircraft following the path indicated past the targets 2, 4, 6, 8 and 10, the frequency of each signal being plotted directly below the targets reflecting it. The horizontal axis represents the positive of the aircraft and the vertical axis the frequency of the signal received thereby. The center line $F_t$ of the graph, represents the transmitted frequency. The upper line, $F_t + F_d$ represents the maximum frequency received by the aircraft, i.e. the signal return from a target a relatively long distance ahead of the vehicle including the maximum Doppler frequency $F_d$. The lower line $F_t - F_d$, represents the minimum frequency received by the aircraft, i.e. the return from a target a relatively long distance behind the vehicle. At the point A on the aircraft path, when all targets are a substantial distance ahead of the aircraft, all targets will return the maximum frequency, i.e. the Doppler shift will be in the positive direction and add to the transmitted frequency resulting in a maximum frequency return. As the aircraft moves along the path and approaches closer to target 2 the frequency begins to drop until the aircraft is immediately over the target when the target is returning a signal identical in frequency to that transmitted. As the aircraft proceeds further along the path toward the position B, the return from target 2 drops below the transmitted frequency until it reaches the minimum frequency or maximum negative Doppler shift in frequency. This same process occurs with the other targets as the aircraft moves towards them, passes directly abeam, and then leaves each target behind. It is important to note that although the signal from each target shifts in frequency from the same maximum positive value, $F_t + F_d$, to the same maximum negative value, $F_t - F_d$, the rate of change of frequency with aircraft position, i.e. the slope of the target return lines in FIGURE 1, is inversely proportional to the distance of the target from the aircraft path. Target 2 lies closest to the aircraft path and consequently the slope of the target return line is fairly steep. Target 6 on the other hand, is furthest from the aircraft path and its slope is therefore the shallowest. It should be noted that the shape of the curve of Doppler frequency plotted as a function of time not only in the central region, but at all points of the curve, is unique for a particular target range from the flight path. Thus the rate of change of the Doppler frequency shift is a measure of the distance of the target from the path of movement of the moving vehicle. As has been previously mentioned, the received signal from any target is exactly the transmitted frequency when there is no relative motion between vehicle and target, i.e. when the target is abeam or at right angles to the line of motion of the aircraft. From the plot of Doppler returns in FIGURE 1, it is possible to determine the range of a target from the slope of the plotted returns. Also the relative bearing of any target with respect to the moving aircraft may be determined since at the time the signal returned by the target exactly equals the transmitted frequency the target is abeam of the aircraft. It is thus possible to uniquely determine the position of any target with respect to the moving aircraft, and conversely, knowing the targets, it is possible to determine the relative position of the moving aircraft with respect to them. It should be noted that as the aircraft proceeds along its path, it is at any given instant receiving many signals which are characteristic of that particular position. As shown in the simplified diagram of FIGURE 1, when the aircraft is directly abeam of target 4 it is receiving a signal at the maximum Doppler frequency from targets 8 and 10 which are at that point substantially ahead of the aircraft. It is also receiving a second signal at a frequency somewhere between the transmitted frequency and the maximum frequency from target 6. It is receiving another signal at the transmitted frequency from target 4 and another signal at the minimum frequency from target 2. In a similar fashion any position along the aircraft path may be characterized by a group of received signals reflected from targets illuminated by a transmitter carried in the aircraft. There is a possibility of a right-left ambiguity, i.e. the aircraft cannot determine from the information presented in FIGURE 1 whether the target lies on its right or its left. However, this can be corrected by the use of a two antenna system in which one antenna illuminates and receives signals from targets to the right of the aircraft and the other side illuminates and receives signals from targets to the left.

Figure 2:
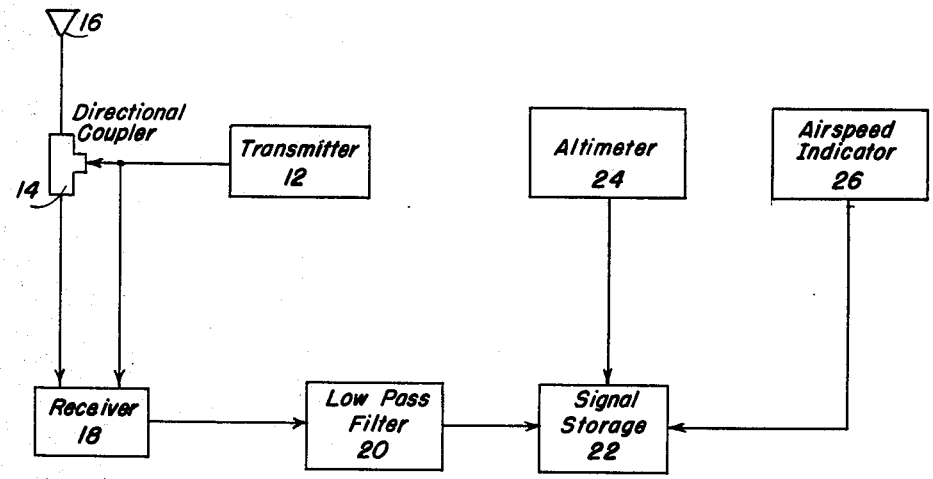
FIGURE 2 is a block diagram illustrating the basic apparatus used to record the variations in Doppler signals from reflected targets during a reconnaissance trip over a selected path.

To guide an aircraft along a predetermined path it is necessary to have a record of the signals which it should see as it moves along the path to compare with those actually received. By such comparison, it is possible to determine the relative position of the aircraft with respect to the targets and automatic control or other devices can then maintain the aircraft on the desired path. The simplest way to obtain this record is to fly a "reconnaissance" flight along the desired path. The block diagram of FIGURE 2 shows equipment which may be used to provide such a record on a magnetic tape recorder or other signal storage device. As shown therein, a transmitter 12 in the aircraft transmits an electromagnetic signal of appropriate frequency through a directional coupler 14 to an antenna 16 which radiates the transmitted signal toward the ground terrain in the vicinity of the aircraft. The signals reflected by the targets on the ground, i.e. lakes, buildings, towers, etc., are received by antenna 16 and are returned through coupler 14 to a receiver 18. As shown in FIGURE 2, a portion of the transmitted signal is also fed to receiver 18, where incoming signals are compared in frequency with the transmitted signal. The output signal from the receiver is the difference between the transmitted signal and the received signal; this signal is passed through low pass filter 20 which passes only the Doppler components and these are stored in a signal storage unit 22 such as a magnetic tape recorder. At the same time, altitude information may be recorded on the tape from a suitable altimeter 24 and the aircraft velocity may also be recorded from its airspeed indicator 26 if desired.

Figure 3:
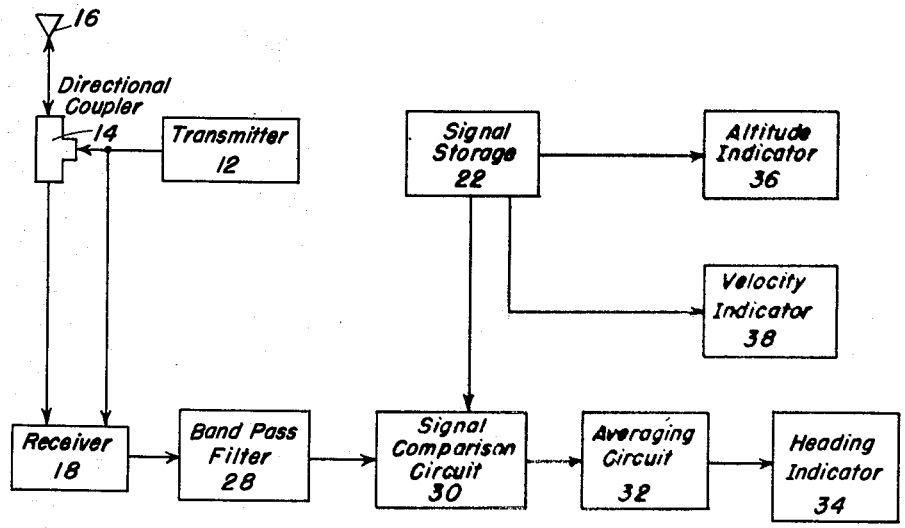
FIGURE 3 is a block diagram of basic guidance apparatus for guiding a vehicle over a predetermined path using the record obtained during the reconnaissance trip.

FIGURE 3 is a block diagram of the apparatus which utilizes the information in the storage unit to guide the aircraft. As shown therein, the transmitter 12 may be used to illuminate the terrain below and surrounding the aircraft. For simplicity only one antenna is shown, although in practice a right and left antenna would probably be used. The signals received by antenna 16 are again compared with the transmitted signal frequency in receiver 18 and the Doppler differences are fed through a band pass filter 28 to a signal comparison circuit 30. At the same time, signals are fed from signal storage unit 22 to signal comparison circuit 30 and there compared with the received signals. The output signal from signal comparison circuit 30 which is proportional to the difference in Doppler deviation of the received and stored signals, is fed through an averaging circuit 32 to an indicating circuit 34, or it may be connected to an autopilot to guide the aircraft. The velocity and altitude signals are also read from the tape and fed either to indicators 36 and 38, or used as input signals to an autopilot. As will be described in more detail below, both altitude and velocity information may be obtained from the comparison of the recorded and received signals if desired. If this is done, of course, the sources of altitude and velocity information 24 and 26 in FIGURE 2 would not be used, and the altitude and velocity indicators 36 and 38 would be fed from signal comparison circuit 30.

Figure 4:
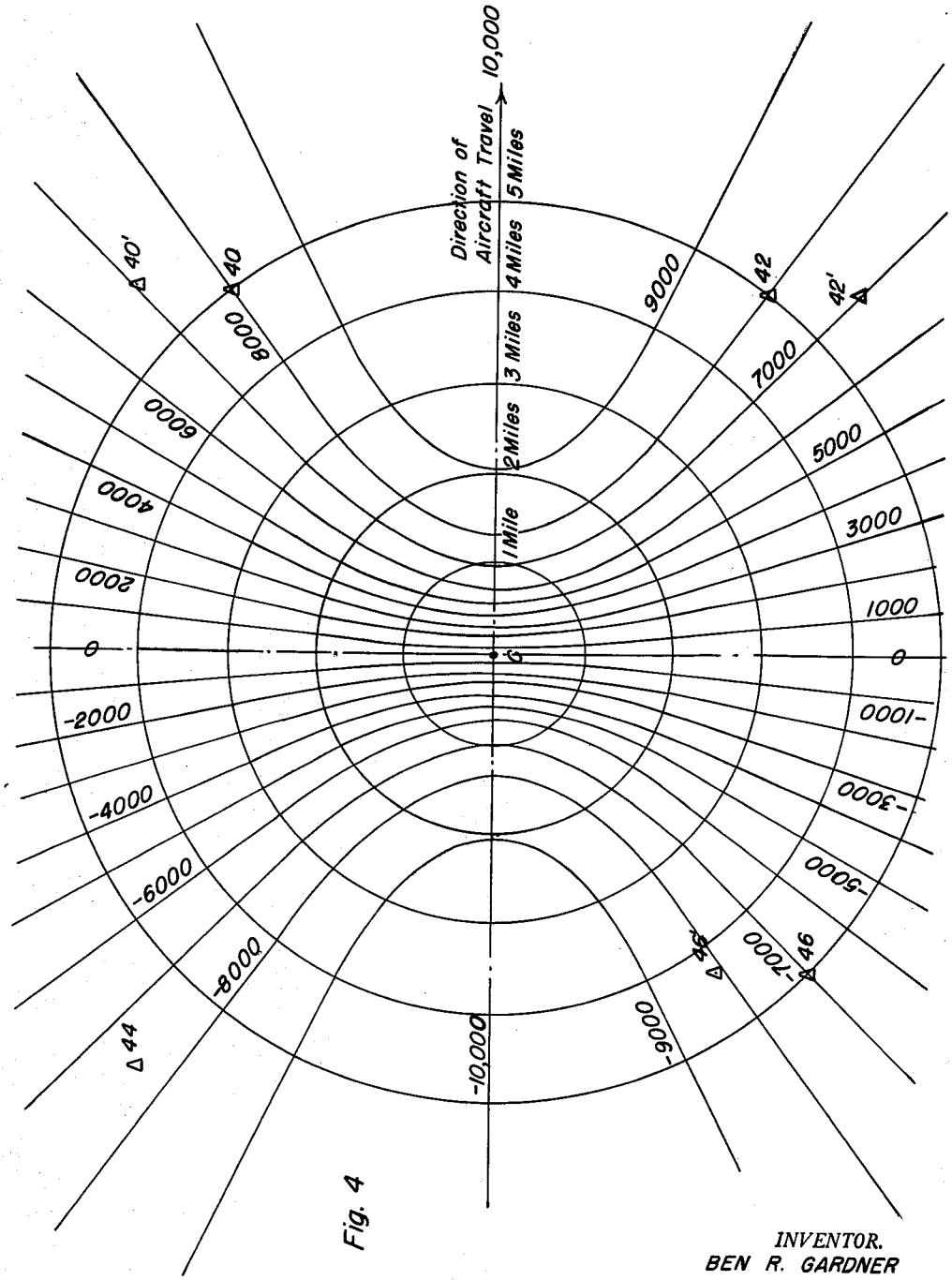
FIGURE 4 is a charge showing the relative location of points of equal Doppler frequency shift in a reflected signal returned to a moving vehicle, and will be herein termed a "Doppler mosaic"

To obtain a more complete understanding of the method and apparatus of my invention, reference should be made to FIGURE 4, which shows a typical Doppler mosaic for a vehicle moving with respect to stationary targets. For illustrative purposes, the mosaic is constructed for an aircraft flying along a straight line at a velocity of 360 miles per hour and at an altitude of one mile. The aircraft is assumed to be equipped with a transmitter transmitting at a frequency of 9.25 kilomegacycles. Calculation will show that the maximum Doppler shift in frequency received by such an aircraft from a stationary ground target will be 10,000 cycles when the target is substantially dead ahead or astern. In FIGURE 4, the aircraft is assumed to be at the point C and flying from left to right along the straight line passing through the center of the mosaic. The concentric circles centered at the point C represent ground ranges of one, two, three, four and five miles respectively from a point on the earth's surface immediately below the aircraft. The various curved lines represent the loci of ground targets which would return the same frequency to a receiver in the aircraft when illuminated by the aircraft's transmitter. These curved lines, which are hyperbolic in shape, represent the intersection of a plurality of cones whose axes lie along the aircraft velocity vector with the ground terrain. For a given Doppler frequency, the cone angle is a function both of aircraft velocity and transmitter frequency. As shown, the lines are drawn for equal Doppler frequency increments.

This Doppler mosaic should be considered as moving with the aircraft. Thus when the aircraft was substantially aft of the position indicated with respect to target 40, this target was returning a frequency 10,000 cycles higher than the transmitted frequency. As the aircraft approached its present position target 40 passed the 9,000 cycle line and at the time shown in the diagram the Doppler frequency reflected by target 40 had dropped to 8,000 cycles. As the aircraft continues to move, target 40 will move in a straight line to the left in the mosaic and the frequency reflected therefrom will continue to drop, until at the point where it is directly abeam of the aircraft the received frequency will be exactly equal to the transmitted frequency. As target 40 continues to move aft in relation to the aircraft, the reflected frequency will be lower than the transmitted frequency and will decrease to a maximum of 10,000 cycles below the transmitted frequency when it is at a substantial distance, i.e. 10 miles aft of the aircraft. From FIGURE 4 it is obvious that a target which lies immediately under the aircraft will have a very rapid rate of change of frequency while a target which lies substantially to one side or the other of the aircraft's flight path will have a somewhat slower change from the maximum positive to the maximum negative frequency. This is in accordance with FIGURE 1 wherein the rate of change of the signal reflected from target 6 was rather slow as compared to target 2, target 6 being a substantial distance from the flight path and target 2 lying immediately under it.

In connection with FIGURE 1, it was stated that it was possible to determine the position of a target with respect to a moving aircraft by observing the rate of change of frequency and the time when the Doppler frequency passes through zero. The rate of change of frequency determines range, and the time when the Doppler frequency passes through zero is the time the target is directly abeam of the aircraft.

However, from FIGURE 3, it will be noted that the frequency of a target return at any time determines a line on the mosaic on which the target is located. As has been previously mentioned, the rate of change of Doppler frequency at any time and not just in the vicinity of the zero Doppler frequency, is uniquely determined by the range of the target for any given frequency. If these data are known, it is possible to uniquely determine target position with respect to a moving aircraft without waiting for the aircraft to fly abeam of the target. The system of my invention uses this latter more generalized method to determine the location of the aircraft with respect to the target.

It is proposed that for guidance purposes, a record will be prepared indicating the frequencies which an aircraft or other vehicle traveling a predetermined path will receive when it is flying on the correct path. This record is compared at the proper time during guidance with the frequency actually being received from the various targets in the Doppler mosaic, FIGURE 4, and the frequency difference is used to indicate deviations in position of the vehicle.

From an examination of the mosaic it can be seen that the signals received from targets in various areas of the mosaic have different uses depending upon their relative positions in the mosaic. For example, the lines of equal Doppler frequency shift in the central portion of the mosaic (−5000 to 5000 cycles) tend to be substantially at right angles to the line of flight of the aircraft, while those at the higher Doppler frequencies (5000 to 10,000 cycles, and −5000 to −10,000 cycles) tend to be more nearly parallel to the aircraft path. When it is realized that during guidance a measured frequency difference between the received signal and the record in the aircraft indicates only a deviation in target position normal to the line of the Doppler mosaic at the target location, it is apparent that the "mid-band" frequencies, i.e. −5000 to 5000 cycles, are useful chiefly in indicating fore and aft deviations. Correspondingly, the lines of the mosaic which correspond to the higher frequencies are primarily useful for determining lateral (right-left) deviations of the aircraft from its flight path. It should be noted, however, that all the lines of equal Doppler frequency deviation cross the flight path at right angles thereto. Thus, in the immediate vicinity of the path, all frequencies are useful in determining fore and aft deviations, and in some applications, all may be used.

Another problem which is present in using the mosaic information is the so-called right-left ambiguity. Referring to the mosaic, if target 40, which lies to the left of the flight path, appeared as shown during the reconnaissance flight but during guidance the aircraft is off course to the right one mile, target 40 will appear at the position 40′ during guidance at the time that the recording indicates its position at 40. It will thus return a lower frequency than it did during the reconnaissance flight. If on the other hand, the aircraft is flying one mile to the left of the prescribed course during guidance, target 42, which lies to the right of the flight path, will appear at the position 42′ and also return a lower frequency. Thus target 40 on the left side of the flight path indicates a right deviation by a lower frequency return, while target 42 on the right hand side of the aircraft indicates a left hand deviation also by a lower received frequency. Therefore, to measure right-left deviations it is necessary to keep the returns from targets to the left of the flight path separated from those to the right of the flight path.

In the same manner that target 40 returns a lower frequency for a right hand deviation, target 46, which is in the area to the rear and to the right of the aircraft, will also return a lower frequency (increase in negative Doppler deviation) for a right hand deviation when it has shifted to the position 46′. Thus returns from the forward left hand area in which target 40 is located and the rear right hand area, in which target 46 is located may be combined, since they have the same lateral "sense," i.e. for a given lateral deviation, the frequency changes in the signals returned by the two targets is in the same direction. In a similar fashion, signals from the rear left hand area in which target 44 is located may be combined with those from the forward right hand area in which target 42 is located since they also have the same lateral "sense." The high and low frequency signals from the forward and rear areas of each side may be separated by simple band pass filters and combined at the filter outputs in a manner to be described.

Figure 5:
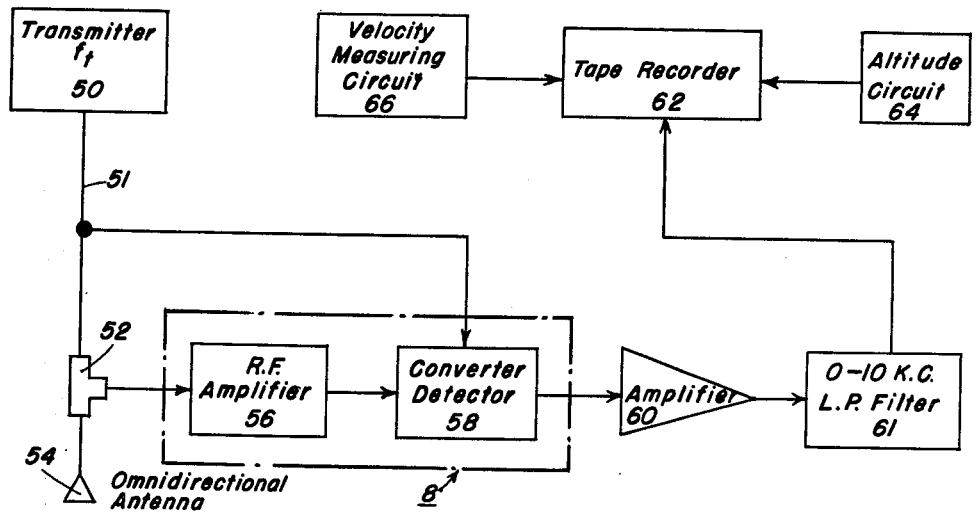
FIGURE 5 is a more detailed block diagram of the equipment shown in FIGURE 2.

FIGURE 5 illustrates in block diagram form, the equipment which could be used in an aircraft to obtain and record the reconnaissance information to be later used for guidance. Transmitter 50, of conventional design, generates a continuous, stable signal at 9250 megacycles, the transmitter tube being preferably a klystron, illustratively a type VA–23 two resonator oscillator. For simplicity of explanation, the transmitted signal is described as continuous, although it could be modulated if desired. The transmitter signal is conducted through directional coupler 52 to omnidirectional antenna 54, to illuminate the terrain below the aircraft. The various features of this terrain, when illuminated by the signal from antenna 54 reflect a portion back to the aircraft to be received by this same antenna and the signal returns are conducted back through coupler 52 to the receiver generally indicated at 8. Because of the motion of the aircraft the received signal is Doppler modulated as heretofore described, the modulation from any given target being dependent upon the relative position of the target in the Doppler mosaic as well as the speed of the aircraft and the transmitting frequency. The received signal may be amplified in conventional radio frequency amplifier 56, which at these frequencies would be a traveling wave tube or the like, and then fed to converter-detector unit 58. Unit 58 mixes the received signal with a portion of the transmitted signal, and in a conventional fashion produces an output whose frequency is the sum and difference between the frequencies of the received and transmitted signals. The difference frequency signal at the output of converter-detector 58 will contain only the Doppler components, since the received signal is substantially identical with the transmitted signal except for these components. Doppler components are separated from the difference frequency signals after amplification by amplifier 60 by passing the signals through low pass filter 61 having a cut-off frequency of 10 kilocycles, the highest Doppler frequency expected. The output of filter 61 is fed to a signal storage unit, in this case illustratively shown as a tape recorder 62. The signal recorded by the tape recorder comprises a plurality of audio-frequency signals, there being one signal for each target which reflects sufficient signal for the receiver to detect. Each of these signals varies in frequency from 10 kilocycles to zero, and then, changing phase, goes from zero to 10 kilocycles again, in the manner shown in FIGURE 1. With the change in phase, the signal subtracts from the transmitted signal.

Velocity and altitude information may also be recorded on the tape as described above. Additionally, velocity information may also be obtained directly from the recorded signal. By observing the maximum Doppler frequency signal returned at any time, with a constant transmitted frequency, velocity may be readily determined since the maximum Doppler frequency is directly dependent upon velocity.

It is also possible to obtain the reconnaissance information without an actual flight by constructing a sonic analogue. In this case a sound generator and receiver are towed through a tank filled with water, in which are placed glass beads or other reflecting material corresponding to the positions of stable targets which would be received by an aircraft following the desired route. By adjusting the frequency of sound transmitted from a sound transmitter, and the speed of the sound transmitter and receiver through the tank, it is possible to record from the sound receiver a nearly exact analogue of the signals which would be received by the aircraft. Records for either immediate or later use in guidance also may be generated synthetically by computer control of a bank of audio oscillators or similar apparatus.

Figure 6:
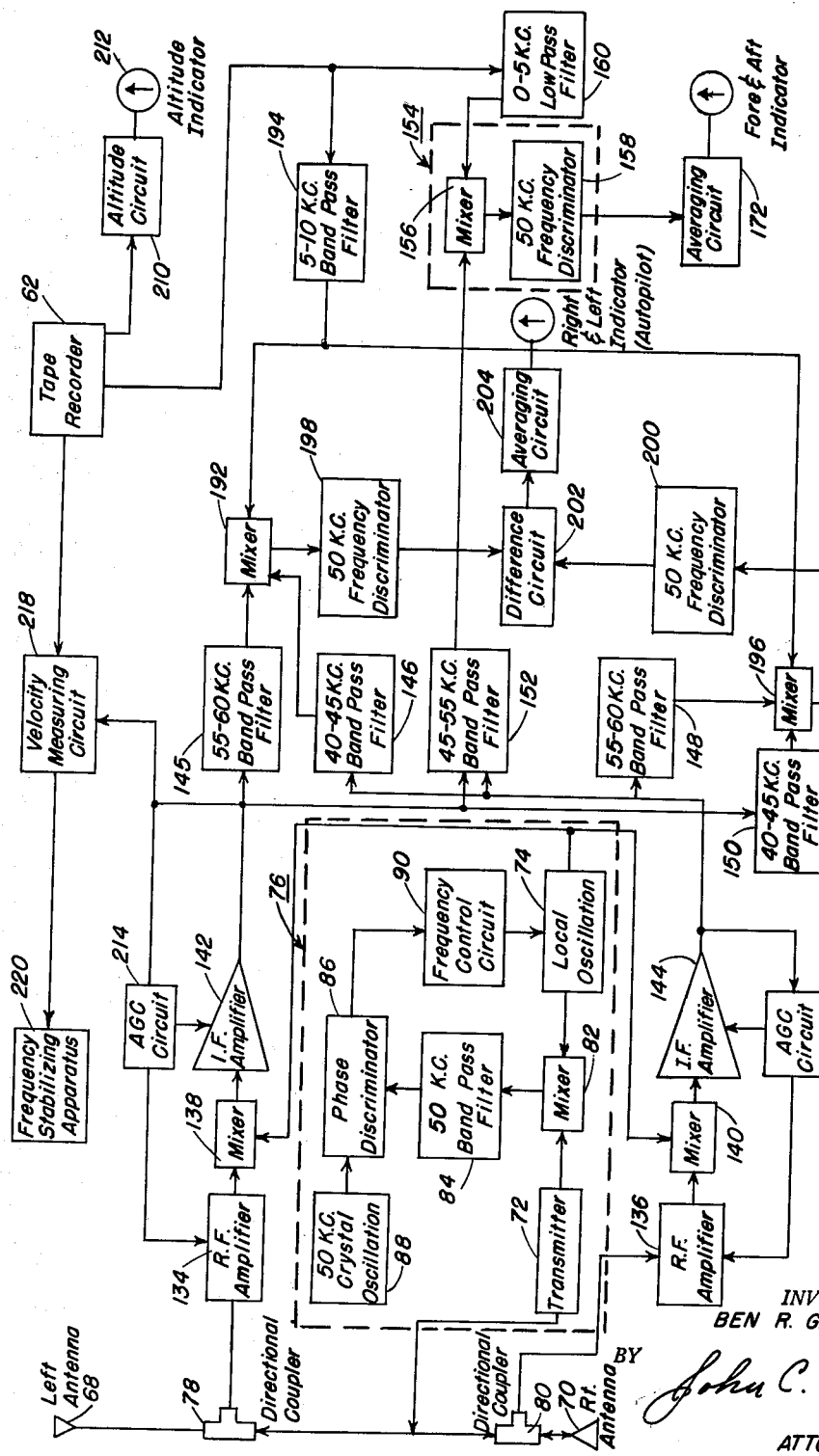
FIGURE 6 is a block diagram of one embodiment of a system which may be used for guiding a vehicle along a predetermined path using the reconnaissance information obtained from the apparatus of FIGURE 5.

Turning now to FIGURE 6, I have here illustrated in block diagram form a specific embodiment of apparatus which may be used to guide an aircraft according to the principle of my invention. This embodiment is designed, for illustrative purposes, to operate at a frequency of 9250 megacycles, the same frequency for which the Doppler mosaic of FIGURE 4 was drawn.

During guidance two antennas, 68 and 70, are used, antenna 68 illuminating the terrain to the left of the aircraft while antenna 70 illuminates the terrain to the right. To minimize drag on high speed aircraft, these antennas may be of the slotted type. By keeping the received signals from the right and left hand sections of the illuminated terrain separated, the right-left ambiguity previously discussed is avoided. Transmitter 72, local oscillator 74 which operates at a frequency 50 kilocycles below the transmitter frequency, and their associated control circuit comprise the guidance transmitter generally indicated at 76. As shown in FIGURE 6, transmitter 72, which at these frequencies could be a reflex klystron of the same type as used in the reconnaissance equipment, feeds its signal through directional couplers 78 and 80 to antennas 68 and 70. The transmitter also feeds its signal to a conventional mixer 82 which is preferably of the crystal diode type. The signal of local oscillator 74 also a reflex klystron, such as type VA-203B, is also fed to the mixer 82; the output of the mixer is filtered by a band pass filter 84 having a narrow bandwidth centered at 50 kilocycles and fed to a phase discriminator circuit 86 to which the output of a 50 kilocycle crystal controlled oscillator 88 is also conducted. The 50 kilocycle signal from oscillator 88 and the 50 kilocycle signal from mixer 82 passed by the band pass filter 84 are compared in phase discriminator 89 and the output, which in magnitude and direction is a measure of the difference between the 50 kilocycle crystal oscillator signal and the signal from the mixer, is fed to frequency control circuit 90 to control the frequency of local oscillator 74.

FIGURE 7 is a schematic diagram of one circuit which could be used to perform the phase discriminator and frequency control functions at a frequency of 9250 megacycles. As shown therein, the output from mixer 82 passed by band pass filter 84 is fed to the primary 92 of the transformer generally indicated at 94. Similarly, the output from crystal oscillator 88 is fed to the primary 96 of the transformer generally indicated at 98. The secondary 100 of transformer 94 and each half of the secondary 102 of transformer 98 are connected in series with each other and with diodes 104 and 106 and the RC filters comprising resistor 108 in parallel with condenser 110, and resistor 112 in parallel with condenser 114.

The signal appearing on secondary winding 100 of transformer 94 acts as a keying voltage permitting conduction of diodes 104 and 106 only during the half-cycle of the signal from filter 84 when their plates 104a and 106a are positive with respect to their cathodes 104b and 106b. The signal from crystal controlled oscillator 88 is fed to each of the diodes in opposite phase. Thus, the output signal appearing across resistors 108 and 112 will be zero only when each diode conducts for one half of the total time that they are keyed "on" by the signal appearing on winding 100. This occurs only when the signal from oscillator 88 is exactly 90° out of phase, either lagging or leading, with the keying signal. Accordingly, the total voltage appearing across both resistors 108 and 112 is a measure of the phase difference between the two input signals.

The output of phase discriminator 86 is applied to a conventional D.C. amplifier used as a frequency control circuit. The amplifier includes triode 116, the cathode 116a of which is connected via a relatively small resistor 118 to a rather large negative potential, illustratively supplied by battery 120. The output of phase discriminator 86 is connected between grid resistor 121 and the negative terminal of battery 120. Plate 116c of triode 116 is connected via plate resistor 122 to the movable arm 124 of potentiometer 126. One end of resistance element 128 of potentiometer 126 is connected to ground and the other to fixed resistor 130. Both resistance element 128 and resistor 130 are of comparable magnitude, and very much larger than cathode resistor 118. Thus almost the entire negative potential of battery 122 will appear across resistor 130 and resistance element 128. By adjusting movable arm 124 of potentiometer 126, the plate voltage of tube 116 and the repeller voltage of reflex klystron 134 to which plate 116c is connected may be initially adjusted to obtain the desired 50 kilocycle frequency difference between transmitter and local oscillator. Thereafter frequency variations will be controlled by variations in direct plate potential of tube 116 responsive to variations in the output of phase discriminator 86, to maintain local oscillator 74 at a frequency exactly 50 kilocycles separated from the transmitter ffrequency.

Returning to FIGURE 6, the signals received by antennas 68 and 70 are coupled through direct couplers 78 and 80 to radio frequency amplifiers 135 and 136 associated with the left and right receivers respectively. After amplification the radio frequency amplifier output signals which may, as mentioned above, contain a plurality of Doppler components, are mixed in mixers 138 and 140 with the output signal of local oscillator 74. Mixers 138 and 140 may be of any conventional type, and are preferably germanium or silicon diodes. The output of the mixer contains the same Doppler modulation components as did the received signal, now grouped around a 50 kilocycle intermediate frequency carrier. The outputs of mixers 138 and 140 are fed to intermediate frequency amplifiers 142 and 144 for amplification, and the amplified signals are fed to a bank of band pass filters 145, 146, 148, 150 and 152. As previously explained, the Doppler frequencies from 5000 cycles to —5000 cycles are primarily useful in determining fore and aft deviations, and it is not important whether they are on the right hand or the left hand side of the desired flight path. Accordingly, the outputs of the amplifiers 142 and 144 are both filtered by band pass filter 152, which has a bandwidth of 45 to 55 kilocycles, and fed to the fore-aft signal comparison circuit generally indicated at 154. Signal comparison circuit 154 comprises a mixer 156 and a frequency discriminator 158 which is similar in operation to the Round-Travis type. It compares the signals from band pass filter 152 with the components of the recorded signal below 5000 cycles passed by low pass filter 160.

The operation of signal comparison circuit 154 to extract information from the received signal indicating a deviation in position of the aircraft in the fore and aft direction can best be understood by reference to FIGURES 8, 9 and 10. As seen in FIGURE 8 (Sheet 4 of the drawings), both the intermediate frequency signal, modulated with the Doppler components, and the recorded signal which has been passed through low pass filter 160 from the tape recorder are fed to mixer 156. Mixer 156 is of the square law type and produces an output signal which contains several components at different frequencies. One of these components has a frequency which is the sum of the frequencies of the two input signals and another has a frequency which is the difference between the frequencies of the two input signals.

The amplitude of the sum and difference frequency components in the mixer output is proportional to the product of the amplitudes of the two input signals to the mixer, the received signal and the recorded signal. Thus if a recorded signal is spurious or transitory, so that there is no corresponding received signal, the mixer will not produce a sum or difference frequency output corresponding to this recorded signal, as the received signal will be zero at the time the recorded signal is fed to the mixer. The same situation will be true if a spurious or transitory signal is received during guidance, for which there is no corresponding recorded signal. Thus signals from unstable targets, or other spurious signals are eliminated, and only information from the useful stable targets is used for guidance.

The output of the mixer is fed to frequency discriminator 158 which includes two band pass filters 162 and 164. The total bandwidth Δ of filters 162 and 164 is centered at 50 kilocycles. Band pass filter 162 has a pass band extending from $$50 \text{ kilocycles} - \frac{\Delta}{2}$$

to an upper frequency limit of 50 kilocycles, while band pass filter 164 has a bandwidth from 50 kilocycles to $$50 \text{ kilocycles} + \frac{\Delta}{2}$$

The total bandwidth Δ of the two filters is made wide enough to accommodate the largest frequency difference between the recorded signal and the Doppler component of the received signal to which it is desired that the system be sensitive. Thus, for blind landing systems, where very little guidance error is desirable, the bandwidth Δ would be made small, e.g. 10 cycles. However, for guidance over long distances where greater error in position is permissible, the bandwidth Δ may be widened to 50 or 100 cycles. Wider bandwidths, which permit greater error, also permit greater latitude in establishing initial lock-on of the guidance system. The characteristics of filters 162 and 164 may be shaped if desired for particular emphasis of low frequency or high frequency differences between the received and recorded signals.

The outputs of band pass filters 162 and 164 are fed to conventional detectors 166 and 168, which convert their output signals to varying direct voltages. The detector signals are then fed to difference circuit 170, which provides an output signal proportional to the difference in amplitude of the two detector signals. This difference signal is then fed to averaging circuit 172 and from there either to an indicator, an auto-pilot, or like means for automatically controlling the aircraft.

The operation of frequency discriminator circuit 158 of FIGURE 8 to produce a direct voltage proportional to the difference in frequency between the Doppler components in the received signal and the stored signal can be understood by reference to the graphs of FIGURE 9 in which frequency is plotted along the vertical axis, and position of the aircraft along the horizontal axis. FIGURE 9a is a graph of the signal recorded on the tape recorder during reconnaissance as the aircraft flew by a given target. As shown therein, as the aircraft approaches the target the target is returning a Doppler frequency of 10 kilocycles. However, as previously described, as the aircraft approaches closer to the target, the Doppler frequency which the target returns drops, reaching zero when the target is directly abeam of the aircraft and then rises again to 10 kilocycles. Since only the Doppler components of the received reconnaissance signal are recorded on the tape recorder, there is no method of determining "negative" Doppler components, i.e. those whose phase is such that they would subtract from the transmitted signal. Accordingly, all Doppler components from the tape itself are positive. As has been described, the frequencies below 5 kilocycles are most useful for fore and aft guidance, and therefore those frequencies in the shaded area may be removed by filter 160 before the recorded signal is fed to mixer 156.

FIGURE 9b is a graph showing the received signal from the same target during guidance. This signal has the same shape as the signal returns of FIGURE 1. It varies from 60 kilocycles when the target is a substantial distance ahead of the aircraft to 40 kilocycles when the target is a substantial distance behind it, passing through 50 kilocycles, the intermediate frequency, when the target is directly abeam of the aircraft. All frequencies above 55 kilocycles and below 45 kilocycles may be removed from the input to mixer 156 by band pass filter 152. Thus only the solid line portion is transmitted by filter 152 to mixer 156 when the aircraft is in its proper fore and aft position.

It is readily apparent that if the aircraft is on course in the fore and aft sense, prior to the time the target passes abeam of the aircraft, the difference frequency signal between the signal of FIGURE 9a and the signal represented by the solid line of FIGURE 9b would be a signal at a frequency of 50 kilocycles. Similarly subsequent to the time the target passes abeam of the aircraft the difference signal would decrease in frequency at a rate twice that of the signal of FIGURE 9b. If the sum of the frequencies of two signals were plotted as a function of time, the result would be a signal rapidly decreasing in frequency to the time the aircraft passed abeam of the target, reaching 50 kilocycles at that time, and thereafter a signal at a frequency of exactly 50 kilocycles. These two signals would produce a zero output from discriminator circuit 158. The 50 kilocycle signal, being at the "center" frequency of the discriminator would produce equal signals from each of the filters 162 and 164 which would cancel. The average signal produced by the rapidly changing "sum" signal before the target passes abeam of the aircraft would be effectively cancelled by the average value of the "difference" signal after the aircraft passes the target. Thus discriminator 158 would produce a zero output indicating that the aircraft was on course.

However, if the aircraft is slightly aft of the course which it should be flying, the received signal will be slightly late with respect to that received from the tape. This is illustrated by the dashed line curve in FIGURE 9b. The bandwidth of the band pass filters 162 and 164 of FIGURE 8 is assumed to be a total 100 cycles, each filter having a bandwidth of 50 cycles. Thus, assuming that the frequency difference between the curve in FIGURE 9a and the retarded curve in FIGURE 9b is less than 50 cycles, the sum and difference frequency signals which will be transmitted to the band pass filters 162 and 164 are shown in FIGURE 9c.

As shown therein, for the first portion of the curve the difference frequency signal will be greater than 50 kilocycles, rising smoothly to a maximum value. As the received signal decreases in frequency and the signal from the tape begins to increase after passing the zero frequency point, the difference frequency begins to change very rapidly and quickly passes out of the bandwidth of discriminator 158. However, the sum of the two signals, which heretofore had been decreasing rapidly, now begins to change rather slowly. Thus the plot of signals which will be passed by the band pass filters 162 and 164 is the combination of the smooth curves shown in FIGURE 9c, the first portion being the result of the difference in the two input signals, and the latter portion the sum of the two input signals. Since this combination of sum and difference frequency signals has an average value greater than 50 kilocycles, they will be transmitted by filter 164 and a positive direct voltage output will be produced by detector 168. The negatvie difference signal will cause a negative voltage spike from the filter 162 and detector 166. However, the average value of the combined signals will be positive, resulting in a positive output voltage. Had the aircraft during guidance been on course but somewhat forward of its proper position, then the average value of the sum and difference signals and thus the output of the discriminator would have been negative rather than positive. By connecting detector 166 to produce a positive output signal for a positive frequency difference and detector 168 to produce a negative output, the signals can be directly summed to obtain the difference signal, which will then be proportional in amplitude and direction to the fore and aft "mismatch" of the aircraft position during guidance as compared to its corresponding position during the reconnaissance flight. This signal can be fed from the difference circuit 170 to the averaging circuit 172, which for example would consist of a single capacitor, and then to the aircraft autopilot or indicator.

A specific circuit which would be used for the frequency discriminator shown in block diagram form in FIGURE 8 is illustrated in schematic form in FIGURE 10. As shown therein, mixer 156 includes a transformer generally indicated at 174 having two primary windings 176 and 178, and two secondary windings 180 and 182. The Doppler components from the tape recorder may be fed to the winding 176, while the Doppler modulated intermediate frequency signal from both receivers, after passing through band pass filter 152, may be fed to winding 178. Windings 180 and 182 are connected in series, and the total signal is applied to the bridge-type diode mixer generally indicated at 184. The output of mixer 184 includes the two signals whose amplitudes are proportional to the product of the amplitude of the two input signals to windings 176 and 178 and whose frequencies are the sum of the input signal frequencies and the difference of the input signal frequencies. As explained, these signals are both fed to band pass filters 162 and 164. Filters 162 and 164 are illustratively shown as having constant K pi sections with M-derived end sections, but other types of filters could, of course, be used. The outputs of filters 162 and 164 are fed to detectors 166 and 168 which are of the conventional voltage doubler type. As previously described, detector 166 will provide a positive output while detector 168 will provide a negative output; these are summed in summing circuit 170 comprising two equal resistors 186 and 188, to form a difference signal. The output of the circuit 170 is fed to averaging circuit which is shown illustratively as a capacitor 190.

The averaging circuit output is fed to an indicator to indicate to the pilot whether an increase or a decrease in velocity is necessary to remain on course. This signal may also be fed to an autopilot, which will automatically adjust the aircraft speed to keep it on course, or it may be fed to a speed control mechanism for the tape recorder. This speed control mechanism would adjust the recorder speed so that the recorded target returns would coincide with the received returns. Thus it would be unnecessary to fly the path during gudiance at exactly the same speed as it was flown during reconnaissance.

Figure 11:
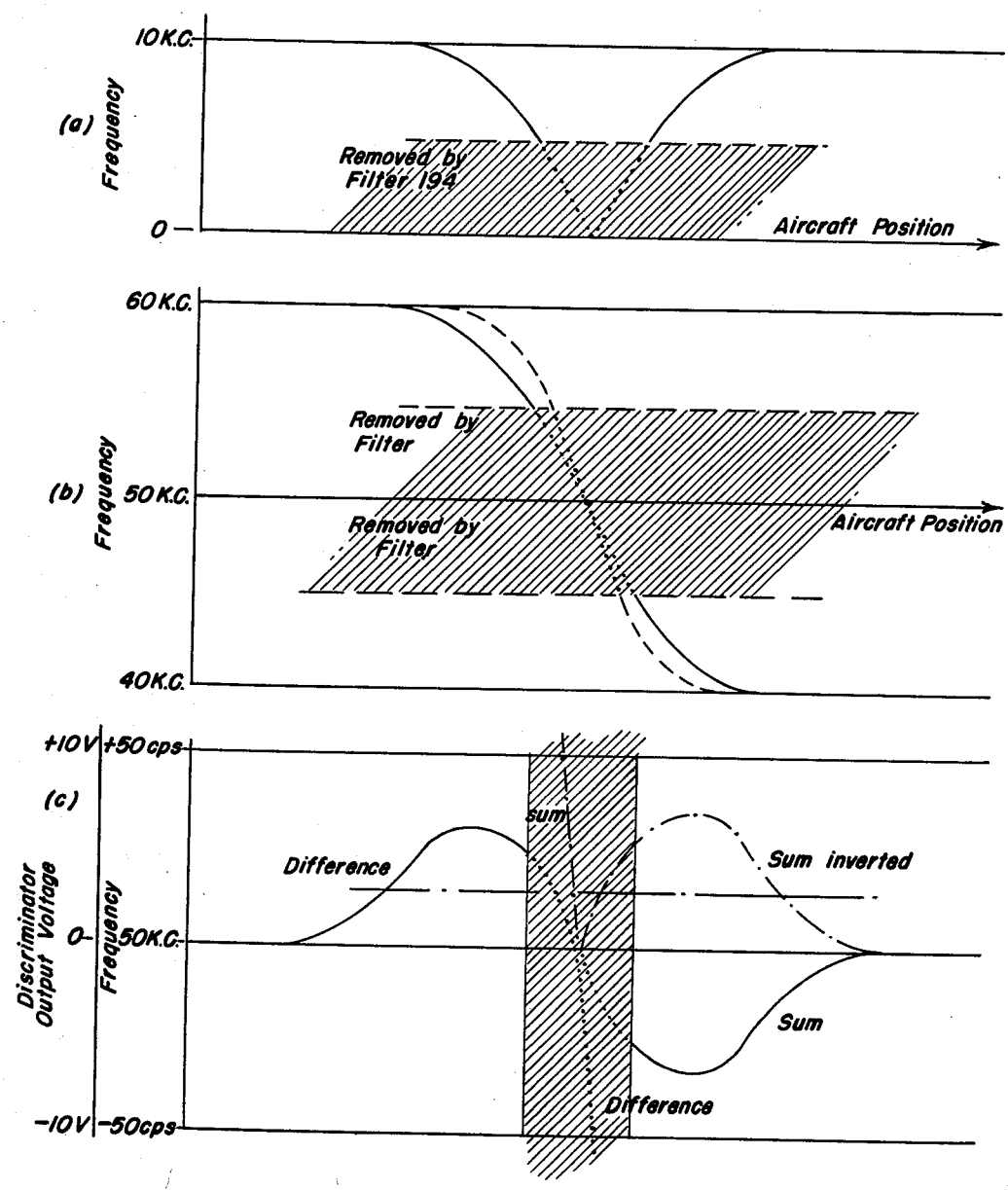

The operation of the guidance system to determine right-left deviations from the prescribed course can best be understood by referring to FIGURE 6. As shown therein, the high frequency components from the left antenna and the low frequency components from the right antenna, which have the same lateral "sense," are filtered by band pass filters 145 and 146 respectively, and fed to mixer 192 to which is also fed the high frequency components from tape recorder 62 passed by band pass filter 194. In a similar manner, the low frequency components from the left antenna and the high frequency components from the right antenna, which also have the same lateral "sense" for right-left deviations, are passed through filters 148 and 150 respectively, summed and fed to mixer 196 together with the output of band pass filter 194. The operation of frequency discriminators 198 and 200 which are substantially similar to discriminator 158 can be understood by reference to FIGURE 11 which is a series of graphs similar to FIGURE 9. FIGURE 11a is a plot against aircraft position of the frequencies fed to mixer 192 or mixer 196 from band pass filter 194. The zero to 5 kilocycle components represented by the dotted portions have been removed by filter 194 for reasons previously discussed. FIGURE 11b is a plot, of the return from a target on the left hand side of the aircraft as a function of its position, the solid line representing the return from the target when it is exactly on course, and the dashed line representing the return from the target when the aircraft has shifted to the left of the pre-determined path. In this latter situation, the target will be closer to the aircraft and, as discussed in connection with FIGURE 1, the slope of the return will be steeper as shown herein. However, if the aircraft is on course in a fore and aft sense, the target will pass abeam of the aircraft at exactly the same time. Accordingly, the return from the aircraft on course and that from the aircraft when it has only shifted to the left of course will coincide at the 50 kilocycle intermediate frequency point. As explained in connection with fore and aft discriminator, when frequency differences between the recorded signal and the received signal are caused by the received signal being late with respect to the recorded signal, the band pass filters of the frequency discriminator will pass the difference frequency for the first portion of the curve. This difference frequency is represented by the solid line in the left hand portion of FIGURE 11c. In this instance, where the aircraft has shifted laterally toward the target, the difference frequency is above the 50 kilocycle intermediate frequency and will result in a positive discriminator output voltage as previously described. After the aircraft has passed by the target however, and the sum rather than the difference frequency is passed by the band pass filters of the discriminator, the sum of the frequencies is a signal whose frequency is below the intermediate frequency rather than above it, and would result in a negative discriminator output voltage. This negative voltage would balance the positive voltage generated by the difference frequency curve and result in a zero average discriminator output which would not be useful for guidance purposes. However, if the sum is inverted, as shown by the alternate dot-dash line of FIGURE 11c, a curve which has an average positive value, which can be used to indicate a left hand deviation is obtained. Inversion is accomplished by feeding the higher frequency left hand components to frequency discriminator 198 of FIGURE 6 and the lower frequency signals to discriminator 200. Discriminator 200 has an output which is opposite in sense to that of discriminator 198 and the difference signal obtained in difference circuit 202 is a measure of the deviation.

For a right hand deviation a similar analysis would indicate that the low frequency components should be fed to frequency discriminator 198 and the high frequency components should be fed to frequency discriminator 200. Thus the low frequency components from the right hand side and the high frequency components from the left hand side can be combined as can the high frequency components from the right hand and the low frequency components from the left hand side in similar discriminators. The only difference between frequency discriminators 198 and 200 of FIGURE 6 is that one frequency discriminator, for example frequency discriminator 198, has a positive detector similar to detector 196 of FIGURE 10 associated with the filter passing the frequencies between 50 kilocycles and $$50 \text{ kc.} + \frac{\Delta}{2}$$

$\Delta$ being the total frequency discriminator bandwidth, and a negative detector associated with the low frequency band pass filter while the other discriminator, i.e. the frequency discriminator 200, has the detectors reversed. In this latter discriminator, the negative detector is associated with the filter passing the higher frequencies and the positive discriminator with that passing the lower frequencies. These signals are combined in the difference circuit associated with each discriminator as previously described, and combined a second time in difference circuit 202. The output of difference circuit 202 is fed to averaging circuit 204 and from the averaging circuit either to a right-left indicator or to the aircraft autopilot to maintain the aircraft on course.

As shown in FIGURE 6, the altitude information which was recorded from an altimeter is fed to an altitude indicating circuit 210 and then to an altitude indicator 212. However, as previously discussed, the Doppler information contained in the incoming signals may be used to determine altitude differences from the flight path in a manner similar to that in which right-left deviations were determined. If the aircraft is on course but is flying at an altitude below that at which it was flying during the time the reconnaisance data was obtained, all targets received by it, both those to the right and those to the left of the antenna will appear to be at a lesser range than appeared during the reconnaissance run. Accordingly, all targets will produce a curve similar to the dashed curved of FIGURE 11b as compared to the signal that should have been received as shown by the solid line curve. The problem of inversion of the signal with the lower frequencies will be the same for both the right and the left antennas, and accordingly, the high frequency signals from both right and left antennas may be combined and fed to a discriminator, whose output is "positive" while the low frequency signals may be combined and fed to a discriminator whose output is "negative." These signals may then be combined in a difference circuit to indicate altitude deviations if desired. For the purpose of clarity, this feature was not included in the embodiment of FIGURE 6. However, it is included in the time sharing embodiment of FIGURE 13 to be discussed hereinafter.

The automatic gain control circuits 214 and 216 of conventional design, associated with the right and the left hand receivers are used to maintain the receiver output level at a substantially constant value.

In describing the operation of my invention, it has been assumed that the maximum Doppler frequencies from the tape recorder and those received by the aircraft are substantially equal. In practice, however, due to variations in the aircraft velocity as it speeds up or slows down to maintain position, or turns to right or left, the maximum and thus all the Doppler components received will vary with the aircraft velocity. Thus if the aircraft is flying on course at the proper speed and is suddenly slowed by headwind, all received signals will drop in frequency, and targets will appear closer to the aircraft than indicated on the record. The return from targets aft of the aircraft in this case would indicate that the aircraft speed should be increased, while the return from targets ahead of the aircraft will indicate that the aircraft velocity should be further decreased. Thus, if the operation of the system remains unchanged the information from the forward targets is in error because of this velocity error. To eliminate this problem, the transmitter frequency is stabilized by the velocity measuring circuit 218 and the frequency stabilizing circuit 220 to maintain the maximum Doppler signals received and those being fed into the system from the tape recorder substantially identical. The operation of these circuits to provide frequency stability during guidance can best be understood by reference to FIGURE 12. As shown therein, velocity measuring circuit 218 receives signals from both the tape recorder and the receiver. The tape recorder signal is fed through band pass filter 222, which passes only the high frequency components and the receiver signal is passed through band pass filter 224, which also passes only the high frequency components. These signals are mixed in mixer 226 and fed to a frequency discriminator 228 of the type illustrated in FIGURES 8 and 10. The operation of this circuit is essentially similar to the operation of the fore and aft sensing circuits, except that only the highest frequency signals from targets forward of the aircraft are used. In some cases maximum frequency signals both from targets forward and targets aft of the aircraft might be used. The frequency of these signals is directly proportional to aircraft velocity. As has been mentioned previously, the Doppler component of the returned signal reflected by ground targets is dependent both on frequency and aircraft velocity. Since the velocity of the aircraft during guidance may be different from that during reconnaissance, the frequency discriminator 228 will provide a direct voltage output proportional to the frequency difference and thus the velocity difference. This direct voltage is fed to the frequency stabilizing apparatus 220 which includes a high gain D.C. amplifier 230 having a feedback path which includes resistor 232. This amplifier provides a direct voltage output which is then fed through amplifier 234 to drive motor 236. Motor 236 in turn is connected through gearing to the cavities of the klystron oscillators in transmitter 72 and local oscillator 74 to adjust the cavities and thereby control the transmitter and local oscillator frequencies. In addition, motor 236 is connected to movable arm 238 of the potentiometer generally indicated at 240. The resistive element 242 of potentiometer 240 is supplied from a source of direct voltage, illustratively shown as a battery 244. The output from the movable arm of potentiometer 240 is connected through resistor 246 to the input of the amplifier 234 so that it is summed with the output of amplifier 230 to provide servo control for the transmitter and local oscillator frequencies. Thus if there is a transient velocity change during guidance from that during the reconnaissance run, the frequency of the transmitter will be adjusted so that the received signals will have substantially the same maximum Doppler component as those recorded on the tape recorder. However if the change in velocity is for a substantial period of time either the aircraft velocity or the tape speed will be adjusted by the system. Thus at all times during guidance the frequency of the transmitter will be adjusted so that the maximum received Doppler frequencies are equal to the stored frequencies.

If the tape speed rather than aircraft velocity is controlled by the fore and aft error measuring circuits during guidance, the stabilizing system will still maintain the frequency of the transmitted signal at the proper value in the following manner. If the aircraft changes from the reconnaissance velocity to the guidance velocity, the stabilizing circuit will initially maintain the transmitter at a frequency corresponding to the reconnaissance speed. However, because of the velocity difference between the aircraft and the tape, a positional error between signals from the tape and the received signals will soon be apparent, and the tape speed will be changed to correct for this positional error. When the tape speed is changed, the transmitter frequency will be corrected by circuits 218 and 220 to maintain the maximum received Doppler frequency and the maximum tape frequency at the same value.

For large differences between reconnaissance and guidance velocities, the maximum received signals and tape signals may be outside the indicated pass band of the band pass filters 222 and 224. In this case, the filters may be constructed utilizing reactance tubes, or similar electrically controlled parameters, so that their bandwidth may be changed electrically by the signal controlling tape recorder speed to conform to the changed conditions.

Turning now to FIGURE 13, I have here illustrated in block diagram form a time sharing embodiment of a complete guidance system made according to my invention which uses somewhat less equipment than the embodiment illustrated in FIGURE 6. The equipment shown in block diagram form in FIGURE 13 may be used both during reconnaissance and guidance by changing a single switch. Further, by using a time sharing switch having several banks, the equipment necessary for guidance operation is greatly simplified. The time sharing embodiment of FIGURE 13 includes a transmitter 72 feeding a single directional coupler 252 rather than the dual directional couplers of FIGURE 6. The output of directional coupler 252 is fed to one bank 254 of a time-sharing switch to be described in detail hereinafter. The switch alternately connects the directional coupler output to left antenna 68 and right antenna 70. While it is connected to either of these antennas the received signals are fed through directional coupler 252 to RF amplifier 256 which is of the type previously described. During reconnaissance, the reconnaissance guidance switch 257 is in the "reconnaissance" position and a portion of the transmitter signal 72 is fed to mixer 258. The output of mixer 258 is fed through amplifier 260 and low pass filter 262 having a bandwidth of zero to 10 kilocycles. The output of filter 262 which contains the Doppler components of the received signal, is then fed through bank 264 of the reconnaissance guidance switch to tape recorder 24. The output of amplifier 260 is also fed to the band pass filters 266, 268 and 270, all of which reject frequencies in the zero to 10 kilocycle range, and thus have no effect during reconnaissance.

During guidance operation, the reconnaissance guidance switching banks 257 and 264 are switched from "reconnaissance" to "guidance." The transmitter signal is still fed through the directional coupler 252 and switch 254 to antennas 68 and 70. The received signal from directional coupler 252 is conducted to amplifier 256 and then mixer 258. During guidance, mixer 258 is fed from local oscillator 74 in the manner previously described, the frequency of local oscillator 74 being maintained at a difference of exactly 50 kilocycles from that of transmitter 72 by the frequency stabilizing apparatus generally indicated at 271 which may be substantially identical with the apparatus of FIGURES 6 and 7. The output of mixer 258 is a 50 kilocycle frequency modulated signal containing the Doppler components received by RF amplifier 256. This signal is amplified by amplifier 260 and then fed to band pass filters 266, 268 and 270. Preferably band pass filter 270, which passes the frequencies from 45 to 55 kilocycles, the frequencies corresponding to the central portion of the Doppler mosiac, supplies mixer 272. Preferably also the low frequency components of the recorded Doppler signal are fed through low pass filter 277 to mixer 272 in the manner previously described, and the output of mixer 272 is fed to frequency discriminator 274 and averaging circuit 276 to operate fore and aft indicator 278, autopilot, or speed control mechanism in the same manner as in the embodiment of FIGURE 6.

The signals from the right and left antennas should be switched in the manner to be described in order to use a single mixer and frequency discriminator for right-left information. Thus, a second bank 280 of the time sharing switch connects the high frequency components from filter 266 to the mixer 282 when coupler 252 is connected to the left antenna and the low frequency components from filter 268 when the coupler is switched to the right antenna, then the high frequency components from the right antenna and finally the low frequency components from the left antenna. The higher frequency components of the recorded signal are simultaneously fed to mixer 282 through band pass filter 284 and the output of mixer 282 is fed to frequency discriminator 286 in the manner previously described. Frequency discriminator 286 is similar to the frequency discriminator previously described except that it provides both a positive and a negative output for each signal. This may be conveniently done using a conventional D.C. amplifier connected to the output of the frequency discriminator shown in FIGURE 10. These positive and negative outputs can be switched to provide both indications of altitude deviation and right-left deviation from the path described. Bank 288 of the time sharing switch provides altitude information while bank 290 provides switching for the right-left components. The following table indicates the manner in which both altitude and right-left information are extracted from the same frequency discriminator:

*Time Sharing Switching—FIGURE 13*

| Time Sharing Switch Position | Antenna (Bank 254) | B.P. Filter Connected to Mixer 282 (Bank 280) | Frequency Discriminator Output Connected to Right-Left Circuits (Bank 290) | Frequency Discriminator Output Connected to Altitude Circuits (Bank 288) |
|---|---|---|---|---|
| 1 | Left | 55–60 kc. (266) | Positive | Positive. |
| 2 | Right | 40–45 kc. (268) | do | Negative. |
| 3 | do | 55–60 kc. (266) | Negative | Positive. |
| 4 | Left | 40–45 kc. (268) | do | Negative. |

It will be noted from this table that when the positive output of frequency discriminator 286 is connected to the right-left averaging circuit, the high frequency components from the left antenna and the low frequency components from the right antenna are successively passed through the discriminator. Similarly, when the negative output of the frequency discriminator is connected to the right-left averaging circuit, the high frequency components from the right antenna and the low frequency components from the left antenna are connected to the discriminator. This is in accordance with the previous discussion wherein it was noted that targets forward of the aircraft and on the left hand side have the same lateral "sense" as those to the rear of the aircraft on the right hand side and vice versa. Also, as previously described, it is necessary to take the difference between these two sets of signals each having the same sense to determine aircraft deviation from the predetermined path. This is done by feeding the averaging circuit with the positive output of the discriminator for one set of signals and the negative output for the other set.

For altitude determination, as was previously discussed, targets ahead of the aircraft all have the same "sense" and targets to the rear of the aircraft all have the same "sense"; again it is necessary to take the difference between these two sets of targets to determine altitude deviation. Thus, as noted from the table, when the high frequencies from both the left and the right antenna are fed to the frequency discriminator, its positive output is connected to the altitude averaging circuit. In a similar fashion when both sets of low frequency signals are fed to the frequency discriminator, the negative output of the discriminator is connected to the altitude averaging circuit. In this way the difference signal will appear on relative altitude indicator 298 or it may be tied to the autopilot for automatic altitude control.

Time sharing switch control circuit 300 controls the operation of the time sharing switch during guidance to insure that it is in synchronism with reconnaissance operation. FIGURE 14 shows a typical switch which may be used for time sharing. As shown therein, only one bank of the switch, for example bank 280, is illustrated. The bank comprises four flat metal segments, 302, 304, 306 and 308 which are connected to the switch terminals, 1, 2, 3, and 4. These segments are quarter sections of an annular ring insulated from each other by insulation block 309. A non-segmented annular ring 310 is also mounted on the block with segments 302, 304, 306 and 308. A wiper arm 312 keyed to a central insulated shaft 314 which passes through all switch banks contacts successively segments 302, 304, 306 and 308 as shaft 314 is rotated connecting them alternately to the commutator segment 310. Rotation of shaft 314 is controlled by a synchronous drive motor 316 which is geared to rotate the shaft 314 at some relatively low speed, for example 60 r.p.m. Motor 316 is driven either from 60 cycle oscillator 318 or from the recorded signal through a 60 c.p.s. filter 320 and a power amplifier 322. Motor 316, power amplifier 322, filter 320, oscillator 318 together with the phasing and initial adjustment circuit 324 comprise the switch control circuit generally indicated at 300 in FIGURE 13. During reconnaissance, the 60 cycle oscillator both drives motor 316 through bank 323 of the reconnaissance guidance switch, and through phasing circuit 324, feeds the signal to the tape recorder for recording on the tape with the reconnaissance information. During guidance, the "reconnaissance-guidance" switch is thrown to the "guidance" position, and the 60 cycle signal, recorded on the tape is fed through phasing circuit 324 to filter 320 and power amplifier 322 to drive the motor.

Phasing circuit 324 provides for proper initial adjustment of the rotational position of motor 316. The output from oscillator 318 is fed to one contact 326 of a cam-operated normally closed switch generally indicated at 328. The other contact 330 of switch 328 is connected to the input of the tape recorder. A disk 332 having a cam portion 334 on the periphery thereof is mounted on a shaft driven by motor 316 so that it rotates in synchronism with the time sharing switch. Cam 334 operates to open switch 328 once each revolution of the time sharing switch, for a period of a few milliseconds; and this interrupted signal is recorded during reconnaissance.

When the embodiment of FIGURE 13 is being used for guidance, the recorded signal is fed into circuit 324 on lead 336 from the tape recorder. This signal is fed both to one contact 337 of a normally open switch 338, also operated by cam 334, and to one fixed contact 340 of a relay generally indicated at 342. The other contact 344 of switch 338 is connected through condenser 346 to a conventional amplitude detector comprising diodes 347 and 348, resistor 350 and condenser 352. The output of the detector is connected to the grid of a triode 354; the plate of the triode is connected through the coil 356 of relay 342 to a source of plate supply voltage, illustratively shown as a battery 358.

During guidance, if the time sharing switch is not in synchronism with the recorded information, normally open switch 338 will be closed by cam 334 at times other than when the recorded signal was interrupted, and thus a 60 c.p.s. pulse will be applied to the detector. It will be rectified and converted to a negative direct voltage to bias triode 354 below cutoff causing relay 342 to be de-energized. When relay 342 is de-energized, its movable contact 360 will switch from contact 340 to contact 362 which is connected to the output of oscillator 318. Drive motor 316 will then operate from oscillator 318 until the drift between the oscillator and the recorded signal causes cam 334 to open switch 338 at exactly the time when the recorded drive signal was interrupted by switch 328. Under these conditions, no biasing voltage will be produced and triode 354 will conduct heavily, since it has zero cathode bias, energizing relay 342, and causing movable contact 360 to engage contact 340, thus supplying the drive motor from the recorded signal. It should be noted that the time constant of the combination of resistor 350 and condenser 352 is made sufficiently long to prevent the tube from beginning to conduct between the 60 cycle pulses applied to the detector when the system is out of synchronism. Should the tape speed vary, so that the information thereon is taken off at a different speed to the frequency discriminators, the signal driving the synchronous motor will also vary causing the motor to change in speed to insure that the switch remains in synchronism with the recorded information at all times.

Thus, I have provided a method and an apparatus for utilizing the Doppler component in a reflected signal from a transmitter carried by a moving vehicle to guide the moving vehicle using waveform-matching techniques. Guidance of the moving vehicle is accomplished by first preparing a record either by having a vehicle traverse the desired path and recording the Doppler components in the reflected signal from targets illuminated by a transmitter in the vehicle, or by synthetic means. During guidance, this record is compared with the signals received from the targets along the path, and from this information the moving vehicle is guided along the path. I have provided means for utilizing the Doppler shift to give indications of fore and aft deviation, right-left deviation and, if used in connection with an aircraft, altitude deviation, or a submarine, depth deviation, and have illustrated two separate embodiments using my invention.

I have also provided means whereby the Doppler mosaic may be stabilized so that it is not necessary to travel the predetermined path at exactly the same speed that it was traveled during reconnaissance. Although I have described the operation of my invention utilizing a continuously operating transmitter, it should be understood that the transmitted signal might be amplitude modulated, frequency modulated, or pulse modulated if desired, and my invention includes systems using these techniques within its scope. Also, although I have described my invention in terms of guiding an aircraft utilizing an electromagnetic signal at a frequency of approximately 9.25 kilomegacycles, it should be understood that the same principles and ideas would apply to a ship, for eample, transmitting sound waves and/or magnetohydrodynamic waves at much lower frequencies. Similarly, other and different frequencies may be used with an aircraft, as for example in a blind landing system where it is desired to have much closer control over the aircraft. It should also be understood that although I have shown the output from a guidance system made according to my invention as feeding an indicator, this information may be fed to an aircraft or ship autopilot to control its heading and velocity. Further, I have indicated that the output from the fore-aft mixer might be fed to an autopilot, or to a speed control mechanism to control the speed of the tape recorder; this would permit the moving vehicle to traverse the pre-determined path along which it was desired to guide it at any speed, without reference to the speed at which the reconnaissance data was obtained.

It will thus be seen that the objects set forth above, among those made apparent from the preceding description, are efficiently attained and, since certain changes may be made in carrying out the above method and in the apparatus set forth without departing from the scope of the invention, it is intended that all matter contained in the above description or shown in the accompanying drawings, shall be interpreted as illustrative and not in a limiting sense. It is also to be understood that the following claims are intended to cover all of the generic and specific features of the invention herein described, and all statements of the scope of the invention, which as a matter of language, might be said to fall therebetween.

I claim:

1. Apparatus for determining deviations in the position of a first body moving along a predetermined path with respect to a second body, comprising, in combination, means causing said second body to radiate a signal therefrom, a receiver in said first body adapted to receive a portion of the signal from the second body, said received signal including a Doppler frequency signal resulting from the relative movement between said bodies, signal storage means in said first body for storing signals corresponding in frequency to the Doppler frequency signals that would be received by said first body if traveling said path with a predetermined relative velocity with respect to said second body, and means for comparing the frequencies of said received signal and said stored signal to thereby measure deviations in position of said first body with respect to said path.

2. The apparatus defined in claim 1 which includes means for controlling the frequency of the signal radiated by said second body to maintain the maximum frequency of the Doppler signal received by said receiver substantially equal to the maximum frequency of the signals stored in said signal storage means.

3. Apparatus for measuring deviations in position of a first body moving in a predetermined path with respect to a second body, said apparatus comprising, in combination, means for generating a signal of known frequency, means causing said second body to radiate said generated signal therefrom, a receiver in said first body adapted to receive a portion of the signal radiated by said second body, said received signal including a Doppler frequency signal resulting from relative movement of said bodies, a signal storage unit in said first body, said unit storing therein signals corresponding in frequency to the Doppler frequency signals which would be received by said first body if traveling said path at a predetermined velocity, a frequency comparison circuit having two inputs, whose output signal is proportional to the difference in frequency of the input signals supplied thereto, means connecting the output signals from said receiver and from said signal storage unit to the inputs of said frequency comparison circuit wherein said received signal and said stored signal are compared in frequency to thereby measure deviations in position of said first moving body with respect to said path.

4. Apparatus for determining deviations in the position of a vehicle moving along a path determined with respect to substantially stationary terrain features, comprising, in combination, a transmitter in said vehicle for transmitting a signal therefrom, a receiver in said vehicle adapted to receive a portion of said transmitted signal which is reflected from said terrain features, said received signal including a Doppler frequency signal resulting from movement of said vehicle with respect to said terrain features, signal storage means in said vehicle for storing signals corresponding in frequency to the Doppler frequency signals that would be received by said vehicle if traveling said path at a predetermined speed, and means for comparing the frequencies of said received signals and said stored signal to thereby measure deviations in position of said vehicle with respect to said path.

5. The apparatus defined in claim 4 which includes means for controlling the frequency of said transmitter to maintain the maximum frequency of the Doppler signal received by said receiver substantially equal to the maximum frequency of the signals stored in said signal storage means.

6. Apparatus for measuring deviations in position of a moving vehicle with respect to a path determined by reference to substantially stationary terrain features, said apparatus comprising, in combination, a transmitter in said vehicle for transmitting a signal therefrom, a receiver in said vehicle adapted to receive a portion of said transmitted signal reflected from said terrain features, said received signal including a Doppler frequency signal resulting from movement of said vehicle with respect to said terrain features, a signal storage unit in said vehicle, said unit storing therein signals corresponding in frequency to the Doppler frequency signals which would be received by said vehicle if traveling said path at a predetermined speed, a frequency comparison circuit having two inputs, whose output signal is proportional to the difference in frequency of the input signals thereto, means feeding the outputs from said receiver and from said signal storage unit to the inputs of said frequency comparison circuit, wherein said received signal and said stored signal are compared in frequency to thereby measure deviations in position of said vehicle with respect to said path.

7. The apparatus defined in claim 6 which includes means for controlling the frequency of said transmitter to maintain the maximum frequency of the Doppler signal received by said receiver substantially equal to the maximum frequency of the signals stored in said signal storage means.

8. Apparatus for measuring deviations of a moving vehicle with respect to a path determined by reference to substantially stationary terrain features, said apparatus comprising, in combination, a transmitter in said moving vehicle, means connected to said transmitter for radiating the signal generated thereby from said vehicle, means for receiving a portion of said radiated signal reflected by said stationary terrain features, a receiver associated with said signal receiving means and adapted to amplify said received signal, said received signal including a Doppler frequency signal resulting from movement of said vehicle with respect to said terrain features, a plurality of band pass filters, means connecting the output of said receiver to said filters to thereby separate said received signal into a plurality of frequency bands, signal storage means in said vehicle for storing signals corresponding in frequency to the Doppler frequency signals that would be received by a vehicle traveling said path at a predetermined speed, a band pass filter associated with said signal storage means whereby the signal stored in said signal storage means may be filtered to generate a frequency band, and frequency comparing means whereby the frequency of corresponding bands of said received signal and said stored signal may be compared to determine separately fore and aft deviations of said vehicle along said path, and right-left deviations of said vehicle from said path.

9. The apparatus defined in claim 8 in which said frequency comparing means includes means for determining altitude deviations of said moving vehicle from said path.

10. The apparatus defined in claim 8 which includes means for controlling the frequency of said transmitter to thereby maintain the frequency of the maximum Doppler signal received by said receiver and the maximum Doppler signal stored in said signal storage means at substantially the same value.

11. Apparatus for guiding a moving vehicle along a predetermined path with respect to fixed terrain features comprising, in combination, a transmitter in said vehicle, two antennas mounted on said vehicle, one of said antennas illuminating the area to the left of said vehicle and the other antenna the area to the right of said vehicle, a receiver associated with each of said antennas, said received signal including a Doppler frequency signal resulting from movement of said vehicle with respect to said terrain features, a plurality of band pass filters, means feeding said receiver outputs to said filters to thereby separate said received signal into a plurality of frequency bands, a signal storage unit in said vehicle for storing signals corresponding in frequency to the Doppler frequency signals that would be received by said vehicle if traveling on said path at a predetermined speed, a band pass filter associated with said signal storage unit to pass a frequency band corresponding to that passed by said receiver filters and frequency comparison means for comparing the frequency of corresponding frequency bands from said received signal and said stored signal, said frequency comparison means generating a signal proportional to the frequency difference between said received and said stored signals and means feeding said signals to apparatus for controlling the direction of motion of said vehicle to thereby guide said vehicle along said path.

12. The apparatus defined in claim 11 which includes a filter passing the higher frequency received Doppler components, means connecting said receiver output to said filter, a second filter passing the higher frequency stored Doppler components, means connecting the output of said signal storage unit to said second filter, frequency comparison means for generating a signal proportional to frequency differences of said filtered Doppler components, and means controlling said transmitter frequency, said transmitter frequency control means being responsive to the signal generated by said frequency comparison means to thereby maintain said transmitter at a frequency such that the highest received Doppler components and the stored Doppler components are substantially identical in frequency.

13. Apparatus for guiding a moving vehicle along a predetermined path with respect to substantially stationary terrain features comprising, in combination, a transmitter; a local oscillator associated with said transmitter; means controlling the frequency of said transmitter and said local oscillator whereby said local oscillator is held at a fixed difference frequency from said transmitter; an antenna mounted on said vehicle; means feeding said transmitter signal to said antenna; a receiver associated with an antenna mounted on said vehicle to amplify the signals received thereby, said received signal including a Doppler frequency signal resulting from movement of said vehicle with respect to said terrain features, said receiver including a mixer, means feeding the output of said local oscillator to said mixer to thereby generate an intermediate frequency signal, and an intermediate frequency amplifier to amplify said intermediate frequency signal; a plurality of band pass filters, means feeding the signal from said receiver to said band pass filters to thereby separate said received signal into a plurality of frequency bands; a signal storage unit in said vehicle for storing signals corresponding in frequency to the Doppler frequency signals that would be received by said vehicle if traveling said path at a predetermined speed; frequency comparison means whose output is proportional to the difference in frequency of the signals fed thereon, means feeding corresponding frequency bands of said received signal and said stored signal to said frequency comparison means, to thereby generate a signal proportional to their frequency difference, and means connecting the output of said frequency comparison means to means for controlling the direction of said vehicle along said path.

14. Apparatus for guiding a moving vehicle along a path predetermined with respect to substantially stationary terrain features, said apparatus comprising, in combination, a transmitter in said vehicle, two antennas mounted on said vehicle, one of said antennas illuminating the area to the left of said vehicle and the other the area to the right of said vehicle, a receiver in said vehicle associated with each antenna to amplify the signals received thereby, said received signal including a Doppler frequency signal resulting from movement of said vehicle with respect to said terrain features, means feeding the output of each of said receivers to a plurality of band pass filters, said of said receivers to a plurality of band pass filters, said band pass filters including one passing the higher frequency Doppler components, and one passing the low frequency Doppler components, a first means combining the high frequency Doppler components from the left antenna with the low frequency Doppler components from the right antenna, a second means combining the high frequency Doppler components from the right antenna with the low frequency Doppler components from the left antenna, and a third means combining the received signals from both antennas, a recorder in said vehicle having signals recorded thereon corresponding in frequency to the Doppler frequency signals that would be received by said vehicle if traveling said path at a predetermined speed, a discriminator, means feeding the output of said third combining means to said discriminator, means feeding the signal stored in said recorder to said discriminator to determine frequency differences therebetween, said frequency differences being a measure of deviation in position along said path, and means for comparing the combined high and low frequency components from said first and second combining means with corresponding frequency components of said recorded signal, to thereby determine deviations in position of said vehicle to the right and left of said path, means generating output signals proportional to said frequency differences, and means for guiding said vehicle, said guiding means being actuated by said output signals.

15. In apparatus for guiding a moving vehicle along a predetermined path with respect to substantially stationary terrain features, in combination, a transmitter in said vehicle, means connected to said transmitter for radiating the signal generated thereby from said vehicle, a receiver associated with said signal, said receiver including a frequency converter to convert said received signal to an intermediate frequency, an intermediate frequency amplifier, said received signals including a Doppler frequency signal resulting from movement of said vehicle with respect to said terrain features, signal storage means in said vehicle for storing signals corresponding in frequency to the Doppler frequency signals that would be received by said vehicle traveling said path at a predetermined speed, frequency comparing means whereby the frequencies of bands of said received signals and said stored signal may be compared to determine deviations of said vehicle from said path, said frequency comparing means including a mixer in which the output of said intermediate frequency amplifier and the output signals of said signal storage means are mixed, means connecting a first band pass filter to the output of said mixer, said filter having a bandwidth from a frequency $$\frac{\Delta}{2}$$

cycles below the intermediate frequency to the intermediate frequency, means connecting a second band pass filter to the output of said mixer, said second filter having a bandwidth from the intermediate frequency to the intermediate frequency plus $$\frac{\Delta}{2}$$

$\Delta$ being the maximum Doppler frequency difference between said received signal and said recorded signal to which the system is responsive, a detector associated with the output of each of said band pass filters, one of said detectors providing a positive output and the other providing a negative output, a summing circuit in which the outputs of said detectors are combined, and an averaging circuit for averaging variations in the output of said frequency comparison circuit, and means responsive to the output of said frequency comparing means for controlling the direction of motion of said vehicle, to thereby guide said vehicle along said path.

16. Apparatus for guiding a moving vehicle along a predetermined path with respect to substantially stationary terrain features comprising, in combination, a transmitter in said vehicle, a local oscillator associated with said transmitter, two antennas mounted on said vehicle, one of said antennas adapted to illuminate the terrain to the right of said vehicle and the other the terrain to the left of said vehicle, directional couplers associated with each of said antennas, means feeding the output of said transmitter to said directional couplers, and means connecting said directional couplers to said antennas, a receiver associated with each of said antennas, said receivers being connected to the directional coupler associated with their antennas, each receiver including a mixer, means feeding the received signal from said antenna to said mixer, and means feeding said local oscillator signal to said mixer to thereby generate an intermediate frequency signal, an intermediate frequency amplifier, the output of each of said intermediate frequency amplifiers being fed to a plurality of band pass filters, said filters including a high frequency band pass filter and a low frequency band pass filter, a tape recorder, said recorder having recorded thereon a signal corresponding in frequency to the Doppler frequency signals which would be received by said vehicle if traveling said path at a predetermined speed, means connecting the output of said recorder to a band pass filter to thereby separate the higher frequency components of said recorded signal from the output thereof, a first frequency comparison means for determining deviations in position of said vehicle along said predetermined path, means connecting the output of said receivers to said frequency comparison means, means connecting the output of said recorder to said frequency comparison means, and means feeding the output of said frequency comparison means to apparatus for controlling the velocity of said moving vehicle, a second and third frequency comparison means for determining deviations to the right and left of said path, said second frequency comparison means having as input signals the high frequency components from said tape recorder, the high frequency components from the receiver associated with said left hand antenna, and the low frequency components from the receiver associated with said right hand antenna, and said third frequency comparison means having as input signals the high frequency components from said tape recorder, the low frequency components from the receiver associated with said left hand antenna, and the high frequency components associated with said right hand antenna, the outputs of said second and third frequency comparison circuits being fed to a summing circuit, and means connecting the output of said summing circuit to means for controlling the right-left direction of said vehicle.

17. The apparatus defined in claim 16 in which said plurality of filters to which said received signals are fed includes a filter passing the mid-band Doppler frequencies received by said receivers, and the output of said recorder is passed through a low pass filter, the output of said mid-band frequency filter and said recorder low pass filter being compared in said first frequency comparison means to thereby determine deviations in position of said vehicle along said predetermined path.

18. The apparatus defined in claim 16 which includes means for maintaining said vehicle at the same altitude as said predetermined path, said means including a fourth frequency comparison means having as inputs the high frequency components from said tape recorder and the high frequency components from both of said receivers, a fifth frequency comparison means having as inputs the high frequency components from said recorder and the low frequency components from both of said receivers, the outputs of said fourth and fifth comparison circuits being fed to a summing circuit, and means connecting the output of said summing circuit to means for controlling the altitude of said vehicle.

19. The apparatus defined in claim 17 which includes a filter connected to one of said intermediate frequency amplifiers capable of passing the higher frequency received Doppler components, a filter connected to said recorder output capable of passing the higher frequency stored Doppler components, a mixer for mixing the outputs of said filters, a frequency discriminator for measuring the variation in frequency of said mixed signal from the intermediate frequency, means feeding said mixed signal to said frequency discriminator, means for controlling the frequency of said transmitter and local oscillator and means feeding the output of said frequency discriminator to said frequency control means, to thereby maintain the transmitting frequency such that the maximum frequency of the received Doppler signal is substantially equal to the maximum frequency of the stored Doppler signal.

20. The apparatus defined in claim 16 in which said first, second and third frequency comparison means are substantially identical, comprising a mixer in which the outputs of said intermediate frequency amplifiers and the output signals of said signal storage means are mixed, means connecting a first band pass filter to the output of said mixer, said first filter having a bandwidth from a frequency $$\frac{\Delta}{2}$$

cycles below the intermediate frequency to the intermediate frequency, means connecting a second band pass filter to the output of said mixer, said second filter having a bandwidth from the intermediate frequency to a frequency $$\frac{\Delta}{2}$$

cycles above the intermediate frequency, $\Delta$ being the maximum Doppler frequency difference between said received signal and said recorded signal to which the system is responsive, a detector associated with the output of said first and second band pass filters, and means for combining the output of said detectors in proper sense to provide the desired control signal.

21. The apparatus defined in claim 16 in which the output of said first frequency comparing means is fed to speed control apparatus for said tape recorder.

22. Apparatus for guiding a moving vehicle along a predetermined path with respect to substantially stationary terrain features, comprising, in combination, a transmitter, a receiver, a directional coupler, means connecting said directional coupler to said transmitter and said receiver, the output of said directional coupler adapted to be connected to an antenna, two antennas mounted on said vehicle, one of said antennas adapted to illuminate the area to the right of said vehicle and the other the area to the left of said vehicle, means alternately connecting the output of said directional coupler to said antennas, whereby said apparatus alternately transmits and receives from the left side and the right side of said vehicle, a first band pass filter passing the higher received Doppler frequencies and a second band pass filter passing the lower received Doppler frequencies, means connecting said receiver output to said band pass filters, a signal storage unit in said vehicle, said unit storing therein signals corresponding in frequency to the Doppler frequency signals which would be received by said vehicle if traveling said path at a predetermined speed, frequency comparing means having an output signal proportional to the Doppler frequency difference of its input signals and having both positive and negative outputs, switching means alternately connecting the output of said first band pass filter and said second band pass filter to said frequency comparing means and means connecting the output of said signal storage unit to said frequency comparing means, switching means alternately connecting the positive and negative output of said frequency comparing means to an averaging circuit, and means connecting the output of said averaging circuit to an autopilot to thereby control the direction of motion of said vehicle, all of said switching means being operated in synchronism.

23. The apparatus defined in claim 22 which includes means for controlling the frequency of said transmitter to maintain the maximum frequency of the Doppler signal received by said receiver substantially equal to the maximum frequency of the signal stored in said signal storage means.

24. Apparatus for guiding a moving vehicle along a predetermined path with respect to substantially stationary terrain features, comprising, in combination, a transmitter, a receiver, a directional coupler, means connecting said directional coupled to said transmitter and said receiver, the output of said directional coupler adapted to be connected to an antenna, two antennas mounted on said vehicle, one of said antennas adapted to illuminate the area to the right of said vehicle and the other the area to the left of said vehicle, switching means alternately connecting the output of said directional coupler to said antennas, whereby said apparatus alternately transmits and receives from the left side and from the right side of said vehicle, a first band pass filter passing the higher received Doppler frequencies, and a second band pass filter passing the lower received Doppler frequencies, means connecting the receiver output to said band pass filters, a signal storage unit in said vehicle, said unit storing therein signals corresponding in frequency to the Doppler frequency signals which would be received by said vehicle if traveling said path at a predetermined speed, frequency comparing means having an output signal proportional to the Doppler frequency difference of its input signals and having both positive and negative outputs, switching means alternately connecting the output of said first band pass filter and said second band pass filter to said frequency comparing means, and means connecting the output of said signal storage unit to said frequency comparing means, said last mentioned connecting means including a band pass filter passing the higher frequency components of said stored signal, switching means alternately connecting the positive and negative output of said frequency comparing means to a first averaging circuit, and means connecting the output of said first averaging circuit to control the right-left direction of said aircraft, switching means alternately connecting the positive and negative outputs of said frequency comparing means to a second averaging circuit, and means connecting the output of said second averaging circuit to control the altitude of said aircraft, all of said switching means being operated in synchronism, a third band pass filter connected to said receiver output, said third band pass filter passing the mid-band frequencies of the received Doppler signal, a second frequency comparing means, means connecting said third band pass filter and the output of said signal storage unit to said second frequency comparing means, and means connecting the output of said frequency comparing means to control velocity of said aircraft along said path.

25. The apparatus defined in claim 24 which includes means for controlling the frequency of said transmitter to maintain the maximum frequency of the Doppler signal received by said receiver substantially equal to the maximum frequency of the signal stored in said signal storage means.

26. The apparatus defined in claim 24 in which the output signal of said second frequency comparing means is used to control the rate of taking data from said signal storage unit.

27. Apparatus for providing signals to guide a moving vehicle along a path predetermined with respect to substantially stationary terrain features comprising, in combination, means for transmitting a signal from said vehicle, receiving means in said vehicle for receiving a portion of the transmitted signal reflected back toward said vehicle by said terrain features, said received signal including a Doppler frequency signal resulting from movement of said vehicle with respect to said terrain features, signal storage means in said vehicle for storing signals corresponding in frequency to the Doppler frequency signals that would be received by said vehicle if traveling said path at a predetermined speed, means for comparing the frequencies of said received signals and said stored signals, and means for developing guidance signals to maintain said vehicle on said predetermined path dependent upon the difference in frequency of said received and said stored signals, said guidance signals indicating deviations in position of said vehicle with respect to said path.

28. The combination defined in claim 27 which includes means for controlling the frequency of said transmitter to maintain the maximum frequency of the Doppler signal received by said receiver substantially equal to the maximum frequency of the signal stored in said signal storage means.

References Cited in the file of this patent

UNITED STATES PATENTS

| | | |
|---|---|---|
| 2,527,548 | Hastings | Oct. 31, 1950 |
| 2,582,588 | Fennessy | Jan. 15, 1952 |
| 2,817,081 | Roberts | Dec. 17, 1957 |
| 2,869,117 | Berger | Jan. 13, 1959 |